United States Patent
Goto et al.

(10) Patent No.: US 7,435,457 B2
(45) Date of Patent: Oct. 14, 2008

(54) LIQUID CRYSTAL COMPOSITION AND LIQUID CRYSTAL DISPLAY DEVICE

(75) Inventors: Shuichi Goto, Chiba (JP); Motoki Yanai, Chiba (JP)

(73) Assignees: Chisso Corporation, Osaka (JP); Chisso Petrochemical Corporation, Tokyo (JP)

( * ) Notice: Subject to any disclaimer, the term of this patent is extended or adjusted under 35 U.S.C. 154(b) by 265 days.

(21) Appl. No.: 11/489,559

(22) Filed: Jul. 20, 2006

(65) Prior Publication Data
US 2007/0018136 A1 Jan. 25, 2007

(30) Foreign Application Priority Data
Jul. 22, 2005 (JP) ............... 2005-212415

(51) Int. Cl.
C09K 19/30 (2006.01)
C09K 19/12 (2006.01)
(52) U.S. Cl. ............... 428/1.1; 252/299.63; 252/299.66
(58) Field of Classification Search ............... 428/1.1; 252/299.63, 299.66
See application file for complete search history.

(56) References Cited

U.S. PATENT DOCUMENTS

| 5,874,022 | A  | * | 2/1999 | Kubo et al. ............ 252/299.01 |
| 6,936,312 | B2 | * | 8/2005 | Torii et al. ................... 428/1.1 |
| 2003/0222244 | A1 | | 12/2003 | Torii et al. |
| 2005/0279968 | A1 | | 12/2005 | Manabe et al. |

FOREIGN PATENT DOCUMENTS

| CA | 2046590 A1 | 6/1991 |
| GB | 2257701 A | 1/1993 |
| WO | 2005/007775 A1 | 1/2005 |

OTHER PUBLICATIONS

CAPLUS 1997:447290.*

* cited by examiner

Primary Examiner—Shean C Wu
(74) Attorney, Agent, or Firm—Hogan & Hartson LLP

(57) ABSTRACT

A liquid crystal composition having a nematic phase and containing at least one compound selected from a group of compounds represented by formula (1) as a first component and at least one compound selected from a group of compounds represented by formula (2-1) or (2-2) as a second component:

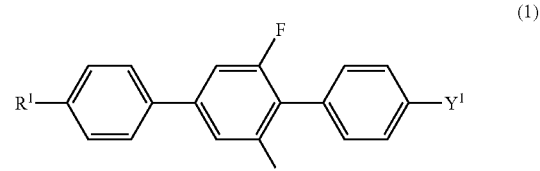

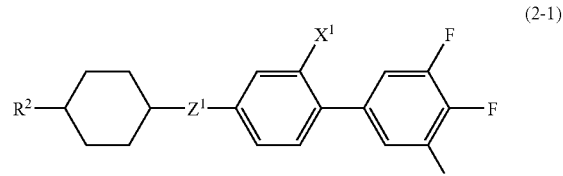

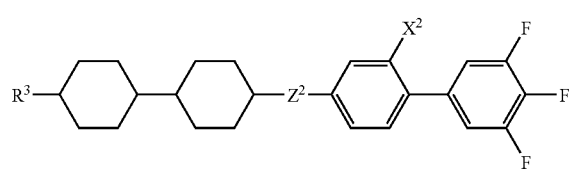

wherein $R^1$ is alkyl or alkenyl; $R^2$ and $R^3$ are independently; $Z^1$ and $Z^2$ are independently a single bond or ethylene; $Y^1$ is fluorine or chlorine; and $X^1$ and $X^2$ are independently hydrogen or fluorine.

24 Claims, No Drawings

LIQUID CRYSTAL COMPOSITION AND LIQUID CRYSTAL DISPLAY DEVICE

CROSS REFERENCE TO RELATED APPLICATIONS

This application claims priority under 35 U.S.C. § 119 to Japanese Patent Application No. JP 2005-212415, filed Jul. 22, 2005, which is expressly incorporated herein by reference in its entirety.

BACKGROUND OF THE INVENTION

1. Field of the Invention

The invention relates to a liquid crystal composition for use in an AM (active matrix) device, and an AM device containing the composition. The composition has a nematic phase and a positive dielectric anisotropy.

2. Related Art

In liquid crystal display devices, classification is based on an operating mode of liquid crystals includes phase change (PC), twisted nematic (TN), super twisted nematic (STN), electrically controlled birefringence (ECB), optically compensated bend (OCB), in-plane switching (IPS), vertical alignment (VA), and so forth. Classification based on a driving mode includes a passive matrix (PM) and an active matrix (AM). PM is further classified into static, multiplex and so forth, and AM is classified into a thin film transistor (TFT), a metal insulator metal (MIM) and so forth. TFT is further classified into amorphous silicon and polycrystal silicon. The latter is classified into a high temperature type and a low temperature type according to a production process. Classification based on a light source includes a reflection type utilizing natural light, a transmission type utilizing a backlight, and a semi-transmission type utilizing both natural light and a backlight.

These devices contain a liquid crystal composition having suitable characteristics. The liquid crystal composition has a nematic phase. General characteristics of the composition should be improved to obtain an AM device having good general characteristics. Table 1 below summarizes the relationship between the general characteristics of the composition and the AM device. The general characteristics of the composition will be explained further based on a commercially available AM device. The temperature range of a nematic phase relates to the temperature range, in which the device can be used. The desirable maximum temperature of a nematic phase is 70° C. or more, and a desirable minimum temperature of a nematic phase is −10° C. or less. The viscosity of the composition relates to the response time of the device. A short response time is desirable for displaying a moving image. Accordingly, a small viscosity of the composition is desirable. A small viscosity at a low temperature is more desirable.

TABLE 1

General Characteristics of Liquid Crystal Composition and AM Device

| No | General Characteristics of a Composition | General Characteristics of an AM Device |
|---|---|---|
| 1 | Temperature range of a nematic phase is wide | Usable temperature range is wide |
| 2 | Viscosity is small[1] | Response time is short |
| 3 | Optical anisotropy is suitable | Contrast ratio is large |
| 4 | Dielectric anisotropy is large | Threshold voltage is low and electric power consumption is small and a contrast ratio is large |
| 5 | Specific resistance is large | Voltage holding ratio is large and a contrast ratio is large |
| 6 | Composition is stable to ultraviolet ray and heat | Service life is long |

[1] A liquid crystal composition can be injected into a cell in a short time.

The optical anisotropy of the composition relates to the contrast ratio of the device. A product (Δn·d) of the optical anisotropy (Δn) of the composition and the cell gap (d) of the device is designed to maximize the contrast ratio. A suitable value of the product depends on the kind of operation mode. In a device having a TN mode and so forth, a suitable value is approximately 0.45 μm. In this case, a composition having a large optical anisotropy is desirable for a device having a small cell gap. A large dielectric anisotropy of the composition contributes to a low threshold voltage, a small electric power consumption and a large contrast ratio. Accordingly, a large dielectric anisotropy is desirable. A large specific resistance of the composition contributes to a large voltage holding ratio and a large contrast ratio of the device. Accordingly, a composition having a large specific resistance is desirable at room temperature and also at a high temperature in the initial stage. A composition having a large specific resistance is desirable at room temperature and also at a high temperature after it has been used for a long time. A stability of the composition to an ultraviolet ray and heat relates to a service life of the liquid crystal display device. In the case where the stability is high, the device has a long service life. These characteristics are desirable for an AM device used in a liquid crystal projector, a liquid crystal television and so forth.

Conventional compositions are disclosed in the following patent documents: JP H6-504032 A/1994 (WO 91/08184 A), GB 2,257,701 A, JP 2003-301178 A (US 2003/0222244 A), WO 2004/035710 A and WO 2005/007775 A.

Desirable AM device characteristics include: a usable temperature range is wide, a response time is short, a contrast ratio is large, a threshold voltage is low, a voltage holding ratio is large, a service life is long, and so forth. Even one millisecond shorter response time is desirable. Thus, the composition having characteristics such as a maximum temperature of a nematic phase, a minimum temperature of a nematic phase, a small viscosity, a large optical anisotropy, a large dielectric anisotropy, a large specific resistance, a high stability to an ultraviolet ray, a high stability to heat, and so forth is especially desirable.

SUMMARY OF THE INVENTION

The invention relates to a liquid crystal composition having a nematic phase and comprising at least one compound selected from a group of compounds represented by formula (1) as a first component and at least one compound selected from a group of compounds represented by formula (2-1) or (2-2) as a second component:

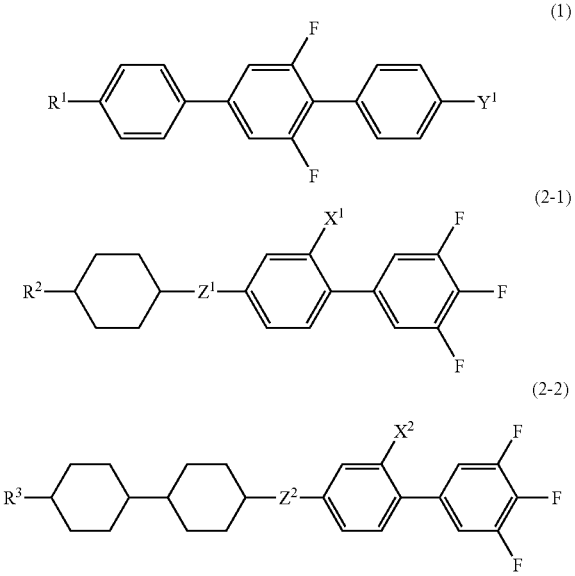

wherein $R^1$ is alkyl having 1 to 12 carbons or alkenyl having 2 to 12 carbons; $R^2$ and $R^3$ are independently alkyl having 1 to 12 carbons; $Z^1$ and $Z^2$ are independently a single bond or ethylene; $Y^1$ is fluorine or chlorine; and $X^1$ and $X^2$ are independently hydrogen or fluorine.

The invention also relates to a liquid display device comprising the liquid crystal composition, and so forth.

DETAILED DESCRIPTION OF THE INVENTION

The terms used in the specification and claims are defined as follows. The liquid crystal composition of the invention or the liquid crystal display device of the invention may occasionally be expressed simply as "the composition" or "the device," respectively. A liquid crystal display device is a generic term for a liquid crystal display panel and a liquid crystal display module. The "liquid crystal compound" is a generic term for a compound having a liquid crystal phase such as a nematic phase, a smectic phase and so forth, and also for a compound having no liquid crystal phase but being useful as a component of a composition. The useful compound contains a 6-membered ring such as 1,4-cyclohexylene and 1,4-phenylene, and a rod like molecular structure. An optically active compound may occasionally be added to the composition. Even in the case where the compound is a liquid crystal compound, the compound is classified into an additive. At least one compound selected from a group of compounds represented by formula (1) may be abbreviated to "the compound (1)." The group of compounds represented by formula (1) may also be abbreviated to "the compound (1)." The other formulas are applied with the same rules.

A higher limit of a temperature range of a nematic phase may be abbreviated to "a maximum temperature." A lower limit of a temperature range of a nematic phase may be abbreviated to "a minimum temperature." "A specific resistance is large" means that the composition has a large specific resistance at room temperature and also at a high temperature in the initial stage, the composition has a large specific resistance at room temperature and also at a high temperature even after it has been used for a long time. "A voltage holding ratio is large" means that a device has a large voltage holding ratio at room temperature and also at a high temperature in the initial stage, the device has a large voltage holding ratio at room temperature and also at a high temperature even after it has been used for a long time. In the description of the characteristics such as optical anisotropy, the characteristics of the composition such as the optical anisotropy and so forth are values measured in the methods disclosed in Examples. "A ratio of the first component" means the percentage by weight (% by weight) based on the total weight of liquid crystal compounds. A ratio of the second component and so forth are applied with the same rule. A ratio of an additive mixed with the composition means the percentage by weight (% by weight) based on the total weight of liquid crystal compounds.

The following compound (4) has a moderate optical anisotropy and a large dielectric anisotropy. The compound is desirable as a component of a composition for an AM device used in a projector, but is not necessarily sufficiently high in stability to an ultraviolet ray. Accordingly, the compound (1) is selected instead of the compound (4) since the compound (1) has a large optical anisotropy and a moderate dielectric anisotropy. In order to supplement the dielectric anisotropy of the compound, the compound (2-1) or the compound (2-2) is selected since these compounds have a moderate dielectric anisotropy. A composition is prepared based on the concept to obtain a compound having characteristics such as a large optical anisotropy, a high stability to an ultraviolet ray and so forth. Component compounds capable of adjusting the characteristics of the composition are further investigated to complete the invention.

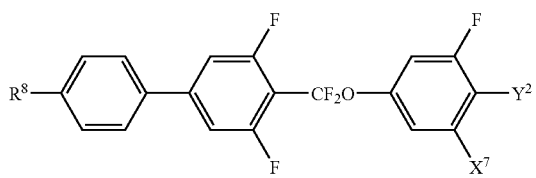

wherein $R^8$ is alkyl having 1 to 12 carbons; $Y^2$ is fluorine or trifluoromethoxy; and $X^7$ is hydrogen or fluorine.

One advantage of the invention is to provide a liquid crystal composition that satisfies many characteristics among the characteristics such as a maximum temperature of a nematic phase, a minimum temperature of a nematic phase, a small viscosity, a large optical anisotropy, a large dielectric anisotropy, a large specific resistance, a high stability to an ultraviolet ray, a high stability to heat. One aspect of the invention is to provide a liquid crystal composition properly balanced regarding many characteristics. Another aspect of the invention is to provide a liquid crystal display device containing such a composition. A further aspect of the invention is to provide a composition having a small viscosity, an optical anisotropy ranging from approximately 0.15 to approximately 0.25, a high stability to an ultraviolet ray, and so forth, and to provide an AM device having a short response time, a large voltage holding ratio, a large contrast ratio, a long service life, and so forth.

The invention relates to a liquid crystal composition having a nematic phase and containing at least one compound selected from a group of compounds represented by formula (1) as a first component and at least one compound selected from a group of compounds represented by formula (2-1) or (2-2) as a second component. The invention also concerns a liquid crystal display device containing the composition.

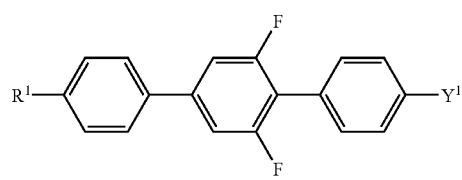
(1)

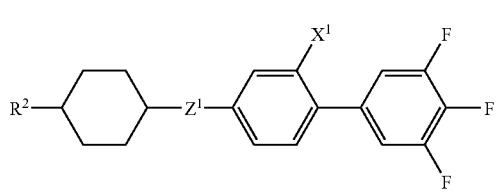
(2-1)

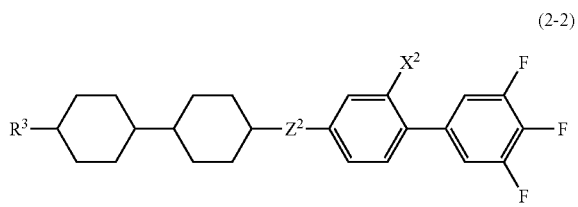
(2-2)

wherein $R^1$ is alkyl having 1 to 12 carbons or alkenyl having 2 to 12 carbons; $R^2$ and $R^3$ are independently alkyl having 1 to 12 carbons; $Z^1$ and $Z^2$ are independently a single bond or ethylene; $Y^1$ is fluorine or chlorine; and $X^1$ and $X^2$ are independently hydrogen or fluorine.

The liquid crystal composition of the invention satisfies many characteristics among the characteristics such as a maximum temperature of a nematic phase, a minimum temperature of a nematic phase, a small viscosity, a large optical anisotropy, a large dielectric anisotropy, a large specific resistance, a high stability to an ultraviolet ray, a high stability to heat. The composition is properly balanced regarding many characteristics. The device contains such a composition. The device has a small viscosity, an optical anisotropy ranging from approximately 0.15 to approximately 0.25, a high stability to an ultraviolet ray, and so forth, and is suitable for an AM device having a short response time, a large voltage holding ratio, a large contrast ratio, a long service life, and so forth.

1. A liquid crystal composition having a nematic phase and comprising at least one compound selected from a group of compounds represented by formula (1) as a first component and at least one compound selected from a group of compounds represented by formula (2-1) or (2-2) as a second component:

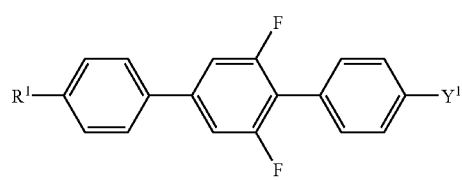
(1)

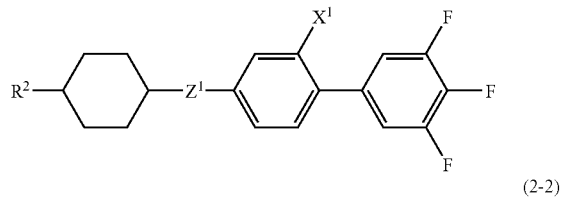
(2-1)

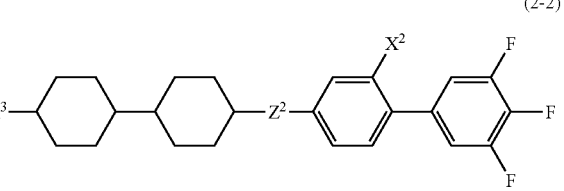
(2-2)

wherein $R^1$ is alkyl having 1 to 12 carbons or alkenyl having 2 to 12 carbons; $R^2$ and $R^3$ are independently alkyl having 1 to 12 carbons; $Z^1$ and $Z^2$ are independently a single bond or ethylene; $Y^1$ is fluorine or chlorine; and $X^1$ and $X^2$ are independently hydrogen or fluorine.

2. The liquid crystal composition according to item 1, wherein the second component is at least one compound selected from a group of compounds represented by formula (2-1).

3. The liquid crystal composition according to item 1, wherein the second component is at least one compound selected from a group of compounds represented by formula (2-2).

4. The liquid crystal composition according to item 1, wherein the second component is at least one compound selected from a group of compounds represented by formula (2-1) and at least one compound selected from a group of compounds represented by formula (2-2).

5. The liquid crystal composition according to one of items 1 to 4, wherein a ratio of the first component is in a range of from approximately 5% to approximately 30% by weight, and a ratio of the second component is in a range of from approximately 30% to approximately 85% by weight, based on the total weight of the liquid crystal compounds.

6. The liquid crystal composition according to item 2, wherein the composition further comprises at least one compound selected from a group of compounds represented by formula (3-1) as a third component:

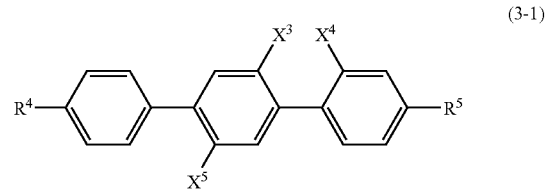
(3-1)

wherein $R^4$ and $R^5$ are independently alkyl having 1 to 12 carbons; and $X^3$, $X^4$ and $X^5$ are independently hydrogen or fluorine.

7. The liquid crystal composition according to item 2, wherein the composition further comprises at least one compound selected from a group of compounds represented by formula (3-2) as a third component:

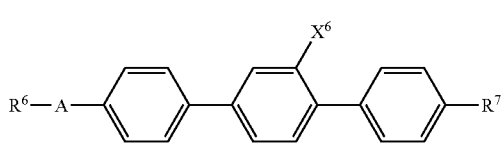
(3-2)

wherein $R^6$ and $R^7$ are independently alkyl having 1 to 12 carbons; A represents 1,4-cyclohexylene or 1,4-phenylene; and $X^6$ is hydrogen or fluorine.

8. The liquid crystal composition according to item 2, wherein the composition further comprises at least one compound selected from a group of compounds represented by formula (3-1) and at least one compound selected from a group of compounds represented by formula (3-2) as a third component:

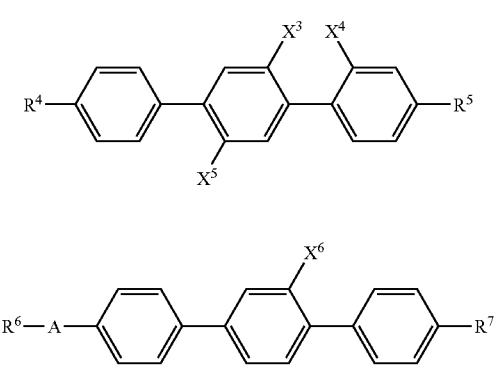
(3-1)

(3-2)

wherein $R^4$, $R^5$, $R^6$ and $R^7$ are independently alkyl having 1 to 12 carbons; A represents 1,4-cyclohexylene or 1,4-phenylene; and $X^3$, $X^4$, $X^5$ and $X^6$ are independently hydrogen or fluorine.

9. The liquid crystal composition according to item 3, wherein the composition further comprises at least one compound selected from a group of compounds represented by formula (3-1) as a third component:

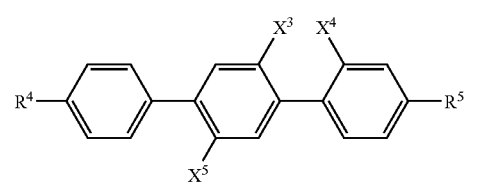
(3-1)

wherein $R^4$ and $R^5$ are independently alkyl having 1 to 12 carbons; and $X^3$, $X^4$ and $X^5$ are independently hydrogen or fluorine.

10. The liquid crystal composition according to item 3, wherein the composition further comprises at least one compound selected from a group of compounds represented by formula (3-2) as a third component:

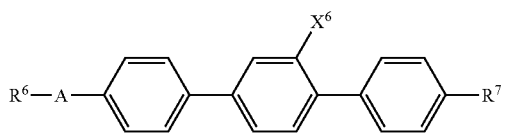
(3-2)

wherein $R^6$ and $R^7$ are independently alkyl having 1 to 12 carbons; A represents 1,4-cyclohexylene or 1,4-phenylene; and $X^6$ is hydrogen or fluorine.

11. The liquid crystal composition according to item 3, wherein the composition further comprises at least one compound selected from a group of compounds represented by formula (3-1) and at least one compound selected from a group of compounds represented by formula (3-2) as a third component:

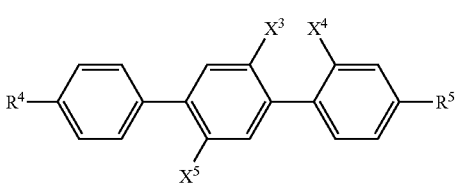
(3-1)

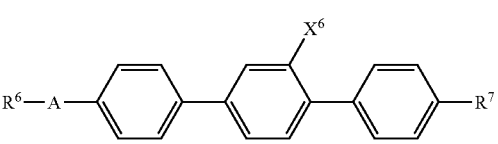
(3-2)

wherein $R^4$, $R^5$, $R^6$ and $R^7$ are independently alkyl having 1 to 12 carbons; A is 1,4-cyclohexylene or 1,4-phenylene; and $X^3$, $X^4$, $X^5$ and $X^6$ are independently hydrogen or fluorine.

12. The liquid crystal composition according to any one of items 6 to 11, wherein in formula (1), $R^1$ is alkyl having 1 to 12 carbons, and $Y^1$ is fluorine; in formula (2-1), $X^1$ is hydrogen; in formula (2-2), $X^2$ is hydrogen; in formula (3-1), at least one of $X^3$ and $X^1$ is fluorine, and $X^4$ is hydrogen; and in formula (3-2), A is 1,4-cyclohexylene, and $X^6$ is fluorine.

13. The liquid crystal composition according to any one of items 6 to 12, wherein the ratio of the first component is in a range of from approximately 5% to approximately 30% by weight, the ratio of the second component is in a range of from approximately 30% to approximately 85% by weight and the ratio of the third component is in a range of from approximately 5% to approximately 40% by weight, based on the total weight of the liquid crystal compounds.

14. A liquid crystal composition having a nematic phase consisting essentially of at least one compound selected from a group of compounds represented by formula (1) as a first component, at least one compound selected from a group of compounds represented by formula (2-1) and at least one compound selected from a group of compounds represented by formula (2-2) as a second component, and at least one compound selected from a group of compounds represented by formula (3-1) or (3-2) as a third component:

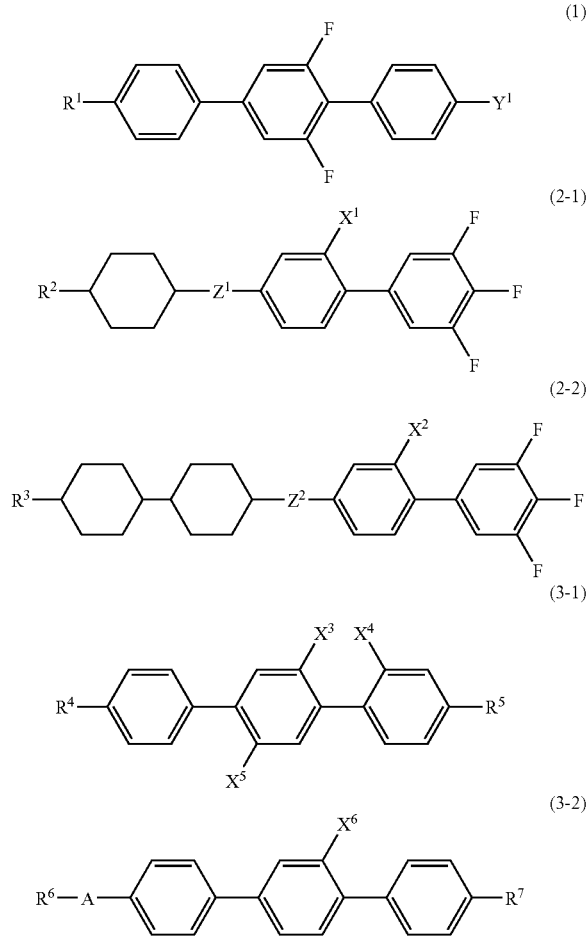

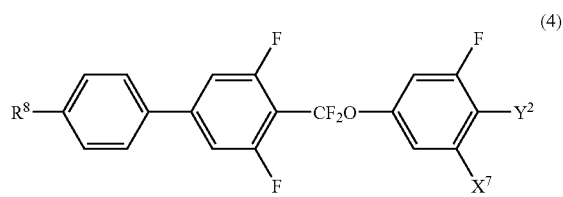

wherein $R^1$ is alkyl having 1 to 12 carbons or alkenyl having 2 to 12 carbons; $R^2$, $R^3$, $R^4$, $R^5$, $R^6$ and $R^7$ are independently alkyl having 1 to 12 carbons; A is 1,4-cyclohexylene or 1,4-phenylene; $Z^1$ and $Z^2$ are independently a single bond or ethylene; $Y^1$ is fluorine or chlorine; and $X^1$, $X^2$, $X^3$, $X^4$, $X^5$ and $X^6$ are independently hydrogen or fluorine.

15. The liquid crystal composition according to item 14, wherein the third component is at least one compound selected from a group of compounds represented by formula (3-1).

16. The liquid crystal composition according to item 14, wherein the third component is at least one compound selected from a group of compounds represented by formula (3-2).

17. The liquid crystal composition according to item 14, wherein the third component is at least one compound selected from a group of compounds represented by formula (3-1) and at least one compound selected from a group of compounds represented by formula (3-2).

18. The liquid crystal composition according to any one of items 14 to 17, wherein in formula (1), $R^1$ is alkyl having 1 to 12 carbons, and $Y^1$ is fluorine; in formula (2-1), $X^1$ is hydrogen; in formula (2-2), $X^2$ is hydrogen; in formula (3-1), at least one of $X^3$ and $X^5$ is fluorine, and $X^4$ is hydrogen; and in formula (3-2), A is 1,4-cyclohexylene, and $X^6$ is fluorine.

19. The liquid crystal composition according to any one of items 14 to 18, wherein the ratio of the first component is in a range of from approximately 5% to approximately 30% by weight, the ratio of the second component is in a range of from approximately 30% to approximately 85% by weight and the ratio of the third component is in a range of from approximately 5% to approximately 40% by weight, based on the total weight of the liquid crystal compounds.

20. The liquid crystal composition according to any one of items 1 to 19, wherein the composition further comprises at least one compound selected from a group of compounds represented by formula (4) as a fourth component:

wherein $R^8$ is alkyl having 1 to 12 carbons; $X^7$ is hydrogen or fluorine; and $Y^2$ is fluorine or trifluoromethoxy.

21. The liquid crystal composition according to item 20, wherein the ratio of the fourth component is in a range of from approximately 1% to approximately 10% by weight based on the total weight of the liquid crystal compounds.

22. The liquid crystal composition according to any one of items 1 to 21, wherein the maximum temperature of a nematic phase is approximately 95° C. or more, the optical anisotropy (25° C.) at a wavelength of 589 nm is approximately 0.16 or more and the dielectric anisotropy (25° C.) at a frequency of 1 kHz is approximately 8 or more.

23. The liquid crystal composition according to any one of items 1 to 22, wherein the composition further comprises an ultraviolet ray absorbent.

24. A liquid display device comprising the liquid crystal composition according to any one of items 1 to 23.

The invention further includes: (1) The composition described above, which further contains an optically active compound; (2) The composition described above, which further contains an additive such as an antioxidant, an ultraviolet ray absorbent and a defoaming agent; (3) An AM device containing the composition described above; (4) A device containing the composition described above and having the mode of TN, ECB, OCB or IPS; (5) A device of a transmission type, containing the composition described above; (6) Use of the composition described above as a composition having a nematic phase; (7) Use as an optically active composition by adding an optically active compound to the composition described above.

The composition of the invention will be explained in the following order. First, the constitution of component compounds in the composition will be explained. Second, the main characteristics of the component compounds and the main effects of the compounds on the composition will be explained. Third, a desirable ratio of the component compounds and the basis thereof will be explained. Fourth, a desirable embodiment of the component compounds will be explained. Fifth, concrete examples of the component compound will be shown. Sixth, additives capable of being mixed with the composition will be explained. Seventh, the preparation methods of the component compound will be explained. Last, use of the composition will be explained.

First, the constitution of component compounds in the composition will be explained. The composition of the invention is classified into the composition A and the composition B. The composition A may further contain other compounds such as another liquid crystal compound, an additive, an impurity, and so forth. This liquid crystal compound is different from the compound (1), the compound (2-1), the compound (2-2), the compound (3-1), the compound (3-2) and the compound (4). Such a liquid crystal compound is mixed with the composition for the purpose of adjusting the characteristics of the composition. The additive includes an optically active compound, a coloring matter, an antioxidant, an ultraviolet ray absorbent and so forth. The impurity is a compound and so forth contaminated in the process such as the synthesis of a component compound and so forth.

The composition B consists essentially of the compounds selected from the compound (1), the compound (2-1), the compound (2-2), the compound (3-1), the compound (3-2) and the compound (4). The term "essentially" means that the composition does not contain a liquid crystal compound which is different from these compounds, but may further contain other compounds (e.g., an additive, an impurity, and so forth). The components of the composition B are fewer than those of the composition A. The composition B is preferable to the composition A from the viewpoint of costs. The composition A is preferable to the composition B, because characteristics of the composition A can be further adjusted by mixing with other liquid crystal compounds.

Second, the main characteristics of the component compounds and the main effects of the compounds on the composition will be explained. The main characteristics of the component compounds are summarized in Table 2. In Table 2, the letter L represents large or high, the letter M represents a middle degree and the letter S represents small or low. The letters L, M and S are classification based on qualitative comparison among the component compounds.

the optical anisotropy and increasing the dielectric anisotropy and is approximately 30% or less for decreasing the minimum temperature. A more desirable ratio is from approximately 5% to approximately 25%, and a particularly desirable ratio is from approximately 10% to approximately 25%.

A desirable ratio of the second component is approximately 30% or more for increasing the dielectric anisotropy and is approximately 85% or less for decreasing the minimum temperature. A more desirable ratio is from approximately 40% to approximately 70%, and a particularly desirable ratio is from approximately 45% to approximately 65%.

A desirable ratio of the third component is approximately 5% or more for increasing the optical anisotropy, increasing the maximum temperature and decreasing the viscosity and is approximately 40% or less for decreasing the minimum temperature and increasing the dielectric anisotropy. A more desirable ratio is from approximately 10% to approximately 35%, and a particularly desirable ratio is from approximately 10% to approximately 35%.

The fourth component is suitable for preparing a composition having a particularly large dielectric anisotropy. The component has a large effect for increasing the dielectric anisotropy but is not necessarily high in stability to an ultraviolet ray. Accordingly, the fourth component is used in the case where a particularly high dielectric anisotropy is to be obtained. A desirable ratio of the fourth component depends on the use of the composition and is determined based on the balance between the large dielectric anisotropy and the stability to an ultraviolet ray. A desirable ratio of the component is approximately 20% or less, a more desirable ratio thereof is approximately 10% or less, and a particularly desirable ratio thereof is approximately 8% or less.

TABLE 2

Characteristics of Compounds

| | Compound (1) | Compound (2-1) | Compound (2-2) | Compound (3-1) | Compound (3-2) | Compound (4) |
|---|---|---|---|---|---|---|
| Maximum Temperature | M | M | L | M | L | S |
| Viscosity | M | M | L | S | M | M |
| Optical Anisotropy | L | S | M | L | L | S |
| Dielectric Anisotropy | M | M | M | S | S | L |
| Specific Resistance | L | L | L | L | L | L |
| Stability to Ultraviolet Ray | L | L | L | L | L | M |

The main effects of the component compounds to the characteristics of the composition upon mixing the component compounds to the composition are as follows: The compound (1) increases the optical anisotropy and increases the dielectric anisotropy. The compound (2-1) and the compound (2-2) increase the dielectric anisotropy. The compound (2-2) increases the maximum temperature. The compound (3-1) and the compound (3-2) increase the optical anisotropy and decrease the viscosity. The compound (3-2) increases the maximum temperature. The compound (4) particularly increases the dielectric anisotropy of the composition.

Third, a desirable ratio of the component compound and the basis therefore will be explained. A desirable ratio of the first component is approximately 5% or more for increasing In the composition A, a desirable total ratio of the first component, the second component, the third component and the fourth component is approximately 70% or more for obtaining good characteristics, and a more desirable ratio is approximately 90% or more. The total ratio of the four components in the composition B is 100%.

Fourth, a desirable embodiment of the component compound will be explained. $R^1$ is alkyl having 1 to 12 carbons or alkenyl having 2 to 12 carbons. Desirable $R^1$ is linear alkyl having 1 to 10 carbons for improving the stability to an ultraviolet ray or heat. $R^2$ to $R^7$ are independently alkyl having 1 to 12 carbons. Desirable $R^2$ to $R^7$ are independently linear alkyl having 1 to 10 carbons.

Desirable alkyl is methyl, ethyl, propyl, butyl, pentyl, hexyl, heptyl, or octyl. More desirable alkyl is ethyl, propyl, butyl, pentyl, or heptyl for decreasing a viscosity.

Desirable alkenyl is vinyl, 1-propenyl, 2-propenyl, 1-butenyl, 2-butenyl, 3-butenyl, 1-pentenyl, 2-pentenyl, 3-pentenyl, 4-pentenyl, 1-hexenyl, 2-hexenyl, 3-hexenyl, 4-hexenyl, or 5-hexenyl. More desirable alkenyl is vinyl, 1-propenyl, 3-butenyl, or 3-pentenyl, for example, for decreasing a viscosity. A desirable configuration of —CH=CH— in these alkenyl depends on the position of a double bond. Trans is desirable in the alkenyl such as 1-propenyl, 1-butenyl, 1-pentenyl, 1-hexenyl, 3-pentenyl, and 3-hexenyl, for example, for decreasing a viscosity. Cis is desirable in the alkenyl such as 2-butenyl, 2-pentenyl and 2-hexenyl. In the alkenyl, linear alkenyl is desirable rather than branched alkenyl.

A represents 1,4-cyclohexylene or 1,4-phenylene. Desirable A is 1,4-cyclohexylene for increasing the maximum temperature and decreasing the minimum temperature. On the configuration of 1,4-cyclohexylene, trans is preferable to cis for increasing the maximum temperature.

$Z^1$ and $Z^2$ are independently a single bond or ethylene (—CH$_2$CH$_2$—). Desirable $Z^1$ is a single bond for decreasing the viscosity.

$X^1$ to $X^7$ are independently hydrogen or fluorine. Desirable $X^1$ in the compound (2-1) is hydrogen for increasing the maximum temperature and decreasing the minimum temperature. Desirable $X^2$ in the compound (2-2) is hydrogen because of the same reasons. Desirable $X^3$, $X^4$ and $X^5$ in the compound (3-1) are fluorine, hydrogen and hydrogen in this order, hydrogen, fluorine and hydrogen in this order, or fluorine, hydrogen and fluorine in this order, for increasing the maximum temperature and decreasing the minimum temperature. More desirable $X^3$, $X^4$ and $X^5$ are fluorine, hydrogen and fluorine in this order, or fluorine, hydrogen and hydrogen in this order. Desirable $X^6$ in the compound (3-2) is fluorine because of the same reasons. Desirable $X^7$ in the compound (4) is fluorine because of the same reasons.

$Y^1$ is fluorine or chlorine. Desirable $Y^1$ is fluorine for increasing the dielectric anisotropy and improving the stability to an ultraviolet ray. $Y^2$ is fluorine or trifluoromethoxy (—OCF$_3$). Desirable $Y^2$ is fluorine for increasing the dielectric anisotropy and improving the stability to an ultraviolet ray.

Fifth, examples of the component compound will be shown. In the desirable compounds described below, $R^1$ is linear alkyl having 1 to 10 carbons or linear alkenyl having 2 to 10 carbons. Alkyl is preferable to alkenyl for improving the stability to an ultraviolet ray. Desirable $R^2$ to $R^7$ are independently linear alkyl having 1 to 10 carbons. In these desirable compounds, trans is preferable to cis for the configuration of 1,4-cyclohexylene for increasing the higher limit temperature. The symbol $R^1$ is used for many compounds in the chemical formulas for the component compounds. $R^1$ may be identical or different in these compounds. In one case, for example, $R^1$ of the compound (1-1) is ethyl and $R^1$ of the compound (1-2) is ethyl. In another case, $R^1$ of the compound (1-1) is ethyl and $R^1$ of the compound (1-2) is propyl. This rule is also applicable to the symbols $R^2$, $R^3$ and so forth.

Desirable compound (1) is the compounds (1-1) and (1-2). More desirable compound (1) is the compound (1-1) for improving the stability to an ultraviolet ray. Desirable compound (2-1) is the compounds (2-1-1) to (2-1-4). More desirable compound (2-1) is the compound (2-1-1) for increasing the maximum temperature and decreasing the minimum temperature. Desirable compound (2-2) is the compounds (2-2-1) to (2-2-4). More desirable compound (2-2) is the compound (2-2-1) for increasing the maximum temperature and decreasing the minimum temperature.

Desirable compound (3-1) is the compounds (3-1-1) to (3-1-3). More desirable compound (3-1) is the compounds (3-1-1) and (3-1-3) for increasing the maximum temperature and decreasing the minimum temperature. Desirable compound (3-2) is the compounds (3-2-1) to (3-2-4). More desirable compound (3-2) is the compounds (3-2-2) and (3-2-3) for increasing the maximum temperature and decreasing the minimum temperature. Particularly desirable compound (3-2) is the compound (3-2-2). Desirable compound (4) is the compounds (4-1) and (4-2). More desirable compound (4) is the compound (4-1) for increasing the dielectric anisotropy.

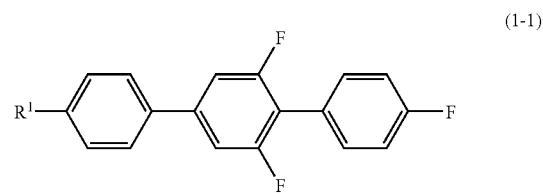

(1-1)

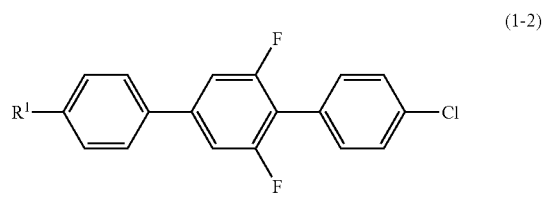

(1-2)

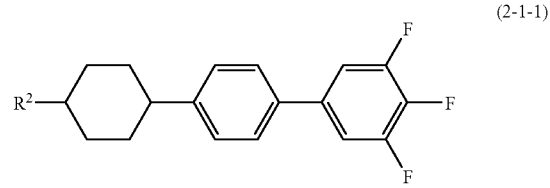

(2-1-1)

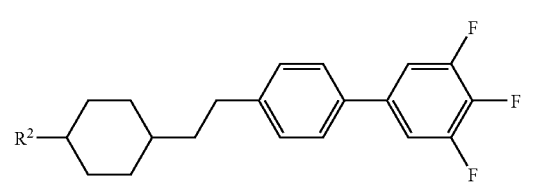

(2-1-2)

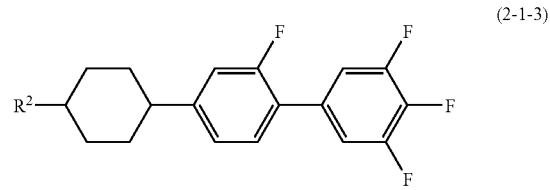

(2-1-3)

-continued (2-1-4)
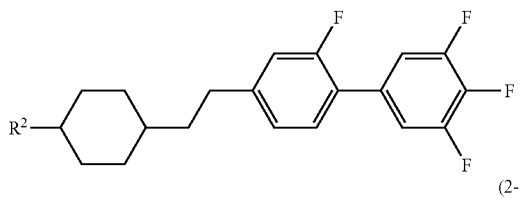

(2-2-1)
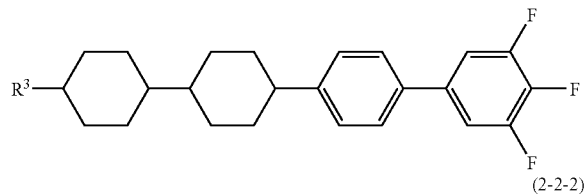

(2-2-2)
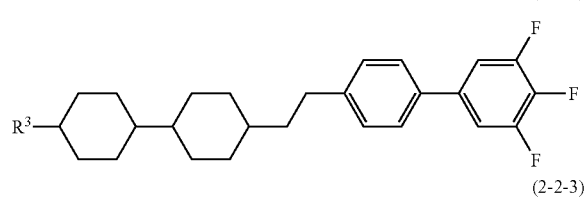

(2-2-3)
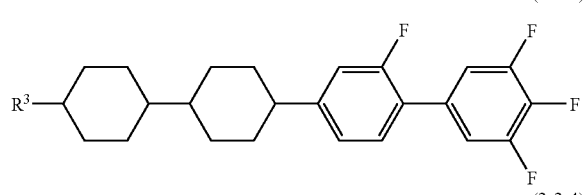

(2-2-4)
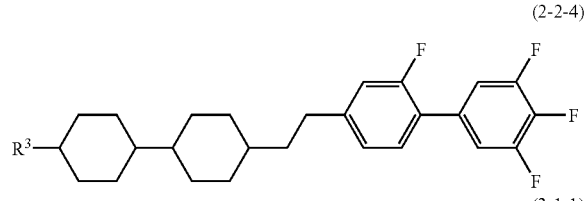

(3-1-1)
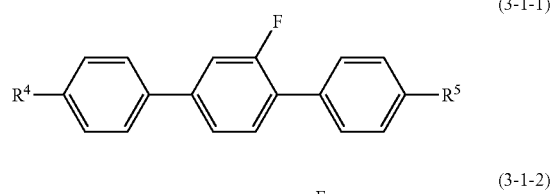

(3-1-2)
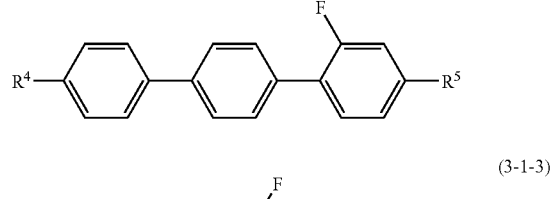

(3-1-3)
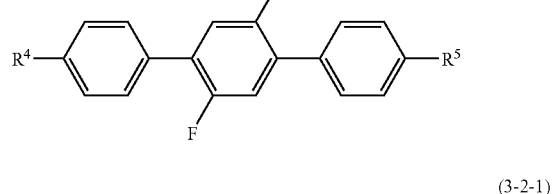

(3-2-1)
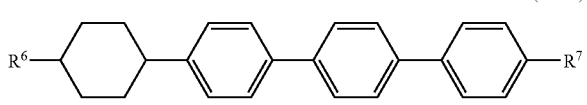

-continued (3-2-2)
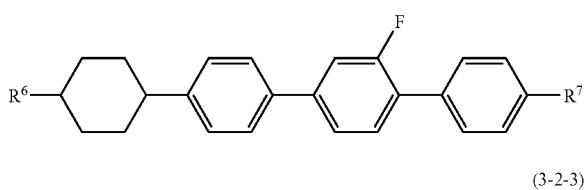

(3-2-3)
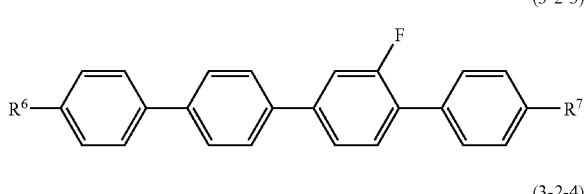

(3-2-4)
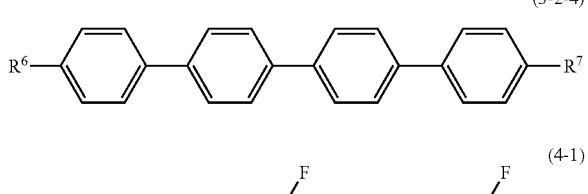

(4-1)
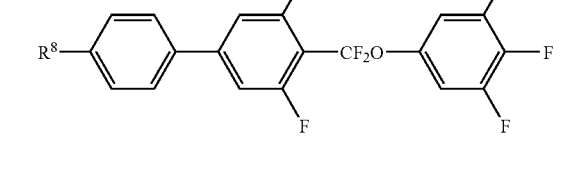

(4-2)
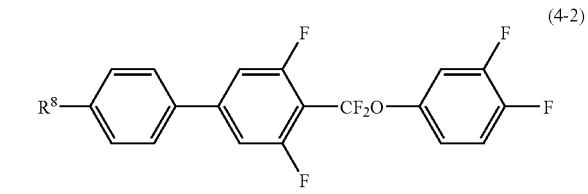

(4-3)
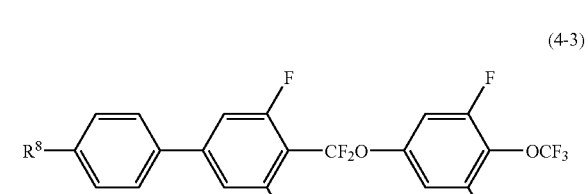

(4-4)
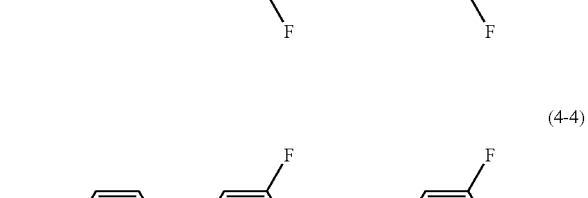

Sixth, additives capable of being mixed with the composition will be explained. The additives include an optically active compound, a coloring matter, an antioxidant, an ultraviolet ray absorbent and so forth. An optically active compound is mixed in the composition for inducing a helical structure of liquid crystal to provide a twist angle. Examples of the optically active compound include the compounds (6-1) to (6-4) below. A desirable ratio of the optically active compound is approximately 5% or less, and a more desirable ratio thereof ranges from approximately 0.01% to approximately 2%.

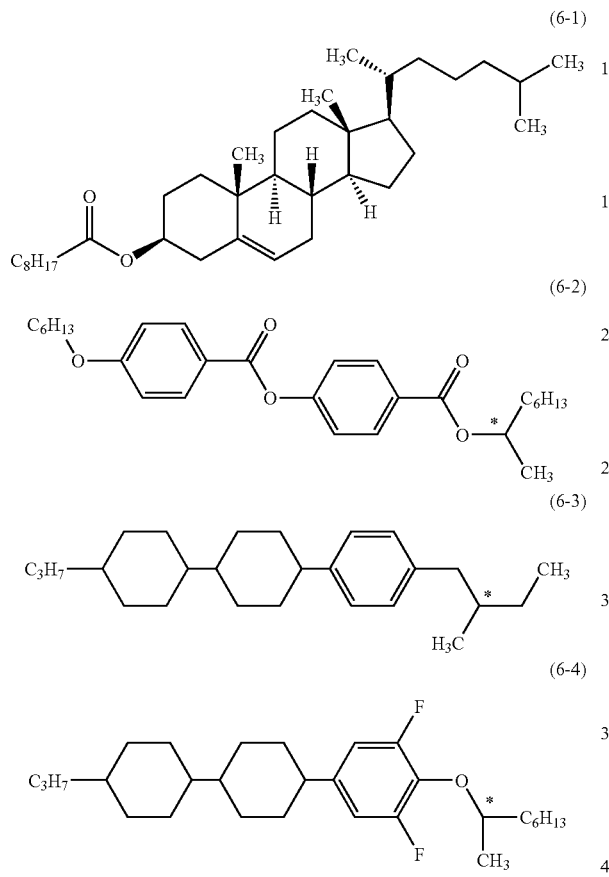

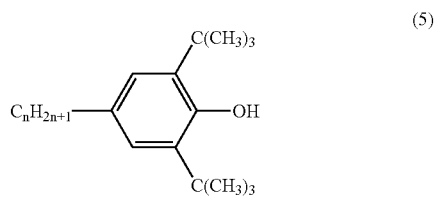

A dichroic dye such as an azo dye or an anthraquinone dye is mixed with the composition to suit for a device of a guest host (GH) mode. A desirable ratio of the dye ranges from approximately 0.01% to approximately 10%. An antioxidant is mixed with the composition in order to avoid a decrease in specific resistance caused by heating in the air, or to maintain a large voltage holding ratio at room temperature and also at a high temperature even after the device has been used for a long time. A desirable ratio of the antioxidant is approximately 50 ppm or more for obtaining the advantage thereof and is approximately 600 ppm or less for preventing the higher limit temperature from being decreased and preventing the minimum temperature from being increased. A more desirable ratio thereof ranges from approximately 100 ppm to approximately 300 ppm.

Preferred examples of the antioxidant include the compound (5) wherein n is an integer of from 1 to 9. In the compound (5), desirable n is 1, 3, 5, 7, or 9. More desirable n is 1 or 7. When n is 1, the compound (5) has a large volatility, and is effective in preventing the decrease of specific resistance caused by heating in the air. When n is 7, the compound (5) has a small volatility, and is effective in maintaining a large voltage holding ratio at room temperature and also at a high temperature even after the device has been used for a long time.

Preferred examples of the ultraviolet ray absorbent include a benzophenone derivative, a benzoate derivative and a triazole derivative. A desirable ratio of the ultraviolet ray absorbent is approximately 50 ppm or more for obtaining the advantage thereof and is approximately 10,000 ppm or less for preventing the higher limit temperature from being decreased and preventing the minimum temperature from being increased. A more desirable ratio thereof ranges from approximately 100 ppm to approximately 1,000 ppm.

Seventh, the preparation methods of the component compounds will be explained. These compounds can be prepared by known methods. The preparation method will be exemplified below. The compound (1-1) is prepared by the method disclosed in JP H6-504032 A/1994. The compounds (2-1-1) and (2-1-2) are prepared by the method disclosed in JP H2-233626 A/1990. The compounds (2-2-1) and (2-2-2) are prepared by the method disclosed in JP H2-233626 A/1990. The compound (3-1-1) is prepared by the method disclosed in JP S60-51135 A/1985. The compound (3-1-3) is prepared by the method disclosed in JP H4-257535 A/1992. The compound (3-2-2) is prepared by the method disclosed in JP H2-237949 A/1990. The compounds (4-1) and (4-4) are prepared by the method disclosed in JP H 10-251186 A/1998.

The compounds for which preparation methods were not described above can be prepared according to the methods described in ORGANIC SYNTHESES (John Wiley & Sons, Inc.), ORGANIC REACTIONS (John Wiley & Sons, Inc.), COMPREHENSIVE ORGANIC SYNTHESIS (Pergamon Press), NEW EXPERIMENTAL CHEMISTRY COURSE (Shin Jikken Kagaku Kouza) (Maruzen, Inc.), and so forth. The compound (5), wherein n is 1, is commercially available. The compound (5) is available, for example, from Sigma-Aldrich, Inc. The compound (5), wherein n is 7, is prepared by the method disclosed in U.S. Pat. No. 3,660,505. The composition is prepared according to known methods using the compounds thus obtained. For example, the component compounds are mixed and dissolved in each other by heating.

Last, use of the composition will be explained. Most of the compositions have a minimum temperature of approximately −10° C. or less, a maximum temperature of approximately 70° C. or more, and an optical anisotropy of approximately 0.15 to approximately 0.25. A device containing the composition has a large voltage holding ratio. The composition is suitable for an AM device. The composition is particularly suitable for an AM device of a transmission type. The composition having an optical anisotropy of approximately 0.15 to approximately 0.25 and further the composition having an optical anisotropy of approximately 0.12 to approximately 0.30 may be prepared by controlling ratios of the component compounds. The composition can be used as a composition having a nematic phase and as an optically active composition by adding an optically active compound.

The composition can be used for an AM device. It can also be used for a PM device. The composition can also be used for an device having a mode such as PC, TN, STN, ECB, OCB, IPS, VA, and so forth. It is particularly desirable to use the composition for a device having a mode of TN or OCB. These devices may be of a reflection type, a transmission type or a semi-transmission type. It is desirable to use the composition for a device of a transmission type. It can be used for an amorphous silicon-TFT device or a polycrystal silicon-TFT device. The composition is also usable for a nematic curvilinear aligned phase (NCAP) device prepared by microcapsulating the composition, and for a polymer dispersed (PD) device in which a three dimensional net-work polymer is formed in the composition, for example, a polymer network (PN) device.

SPECIFIC EXAMPLES

The following examples are for illustrative purposes only and are not intended, nor should they be interpreted to, limit the scope of the invention.

The invention will be explained in detail by way of Examples. The invention is not limited by the Examples described below. The compounds described in the Comparative Examples and the Examples are expressed by the symbols according to the definition in Table 3 below. In Table 3, the configuration of 1,4-cyclohexylene and 1,3-dioxane-2,5-diyl is trans. The configuration regarding a bonding group of —CH=CH— is trans. The parenthesized number next to the symbolized compounds in the Examples corresponds to the number of the desirable compound. The symbol (–) means other liquid crystal compound. A ratio (percentage) of a liquid crystal compound is percentage by weight (% by weight) based on the total weight of liquid crystal compounds. Last, the characteristics of the composition are summarized.

TABLE 3

Method of Description of Compound using Symbols
R—(A$_1$)—Z$_1$—...—Z$_n$—(A$_n$)—X

| | Symbol |
|---|---|
| 1) Left Terminal Group R— | |
| C$_n$H$_{2n+1}$— | n— |
| C$_n$H$_{2n+1}$O— | nO— |
| C$_n$H$_{2n+1}$OC$_n$H$_{2n}$— | mOn— |
| CH$_2$=CH— | V— |
| CH$_2$=CH—CH=CH—(CH$_3$)$_2$— | IV2— |
| 2) Right Terminal Group —X | |
| —C$_n$H$_{2n+1}$ | —n |
| —OC$_n$H$_{2n+1}$ | —On |
| —F | —F |
| —Cl | —Cl |
| —OCF$_3$ | —OCF3 |
| —OCF$_3$CFHCF$_3$ | —CF2CFHCF3 |
| 3) Bonding Group —Z$_n$— | |
| —C$_2$H$_4$— | 2 |
| —COO— | E |
| —CH=CH— | V |
| —C≡C— | T |
| —CF$_2$O— | X |
| 4) Ring Structure —A$_n$— | |
| 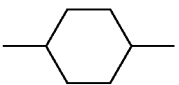 | H |
| 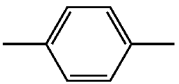 | B |

TABLE 3-continued

Method of Description of Compound using Symbols
R—(A$_1$)—Z$_1$—...—Z$_n$—(A$_n$)—X

| | |
|---|---|
| 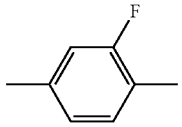 | B(F) |
| 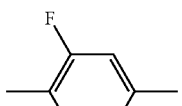 | B(2F) |
| 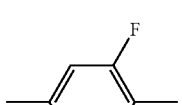 | B(F, F) |
| 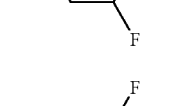 | B(2F, 5F) |
| 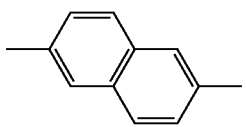 | Np |
| 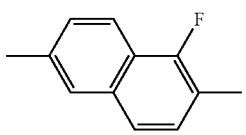 | Np(F) |

5) Example of Description

Example 1   5-HB—Cl

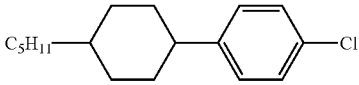

Example 2   2-H2B(F)B(F,F)—F

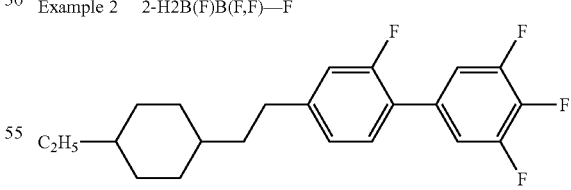

Example 3   IV2-BB(F,F)B—F

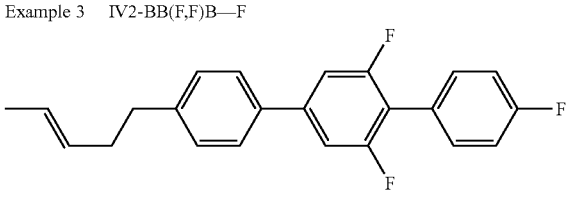

TABLE 3-continued

Method of Description of Compound using Symbols
R—(A$_1$)—Z$_1$— ... —Z$_n$—(A$_n$)—X Example 4    5-HBB(F)B-2

C$_5$H$_11$—⟨cyclohexyl⟩—⟨phenyl⟩—⟨phenyl(F)⟩—⟨phenyl⟩—C$_2$H$_6$

The composition is prepared by first measuring components such as a liquid crystal compound and then by mixing them. Thus, it is easy to calculate the percentage by weight of the component. However, it is not easy to calculate exactly the ratios of the components by analyzing the composition with gas chromatography. It is because the correction coefficient depends on the kind of a liquid crystal compound. Fortunately, the correction coefficient is approximately 1. Furthermore, the difference of approximately 1% by weight only slightly influences on characteristics of the composition. Therefore, the peak area ratio of the component peaks in the gas chromatograph can be regarded as a percentage by weight of the component compound. Namely, the results of gas chromatographic analysis (peak area ratio) are considered to be equivalent to the percentage by weight of a liquid crystal compound without correction.

When a sample was a composition, it was measured as it was, and the obtained value is described here. When a sample was a compound, a sample for measurement was prepared by mixing 15% by weight of the compound and 85% by weight of mother liquid crystals. A value of characteristic of the compound was calculated by extrapolating from a value obtained by measurement. Namely: extrapolated value= (value measured−0.85×value measured for mother liquid crystals)/0.15. When a smectic phase (or crystals) separated out at this ratio at 25° C., a ratio of the compound and mother liquid crystals was changed step by step in the order of (10% by weight/90% by weight), (5% by weight/95% by weight), (1% by weight/99% by weight), respectively. Values for a maximum temperature, optical anisotropy, viscosity, and dielectric anisotropy of the compound were obtained by the extrapolation.

The composition of the mother liquid crystals is as shown below:

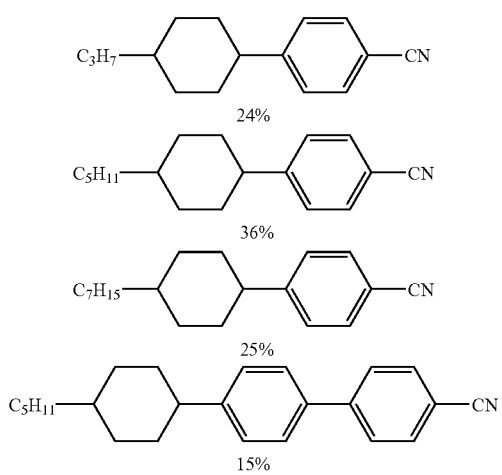

Measurement of the characteristics was carried out according to the following methods. Most methods are described in the Standard of Electric Industries Association of Japan, EIAJ ED-2521 A or those with some modifications. A TFT was not attached to a TN device used for measurement.

A maximum temperature of a nematic phase (NI; ° C.): A sample was placed on a hot plate in a melting point apparatus equipped with a polarizing microscope and was heated at the rate of 1° C. per minute. A temperature was measured when a part of the sample began to change from a nematic phase into an isotropic liquid. A higher limit of a temperature range of a nematic phase may be abbreviated to "a maximum temperature."

A minimum temperature of a nematic phase (Tc; ° C.): A sample having a nematic phase was put in a glass vial and then kept in a freezer at temperatures of 0° C., −10° C., −20° C., −30° C., and −40° C. for ten days, respectively, and a liquid crystal phase was observed. For example, when the sample remained in a nematic phase at −20° C. and changed to crystals or a smectic phase at −30° C., Tc was expressed as ≦−20° C. A minimum of a temperature range of a nematic phase may be abbreviated to "a minimum temperature."

Viscosity ($\eta$; mPa.s; measured at 20° C.): A viscosity was measured by means of an E-type viscometer.

Rotation viscosity ($\gamma 1$; mpa.s; measured at 25° C.): Rotation viscosity was measured according to the method disclosed in M. Imai, et al., Molecular Crystals and Liquid Crystals, Vol. 259, p. 37 (1995). A sample was placed in a device, in which a twist angle was 0°, and a cell gap between two glass plates was 5 μm. The TN device was impressed with a voltage in a range of from 16 V to 19.5 V stepwise by 0.5 V. After a period of 0.2 second with no impress of voltage, voltage impress was repeated with only one rectangular wave (rectangular pulse of 0.2 second) and application of no voltage (2 seconds). A peak current and a peak time of a transient current generated by the voltage impress were measured. Rotation viscosity was obtained from the measured values and the calculating equation (8) in the literature by M. Imai, et al., p. 40. As the dielectric anisotropy necessary for the calculation, the value measured by the measuring method of dielectric anisotropy described below with the device for measuring the rotation viscosity was used.

Optical anisotropy ($\Delta n$; measured at 25° C.): Measurement was carried out with an Abbe refractometer mounting a polarizing plate on an ocular using a light at a wavelength of 589 nm. The surface of a main prism was rubbed in one direction, and then a sample was dropped on the main prism. Refractive index ni∥ was measured when the direction of a polarized light was parallel to that of the rubbing. Refractive index ni was measured when the direction of a polarized light was perpendicular to that of the rubbing. A value of optical anisotropy was calculated from the equation: $\Delta n = n\| - n\perp$.

Dielectric anisotropy ($\Delta \epsilon$; measured at 25° C.): A sample having a nematic phase was put in a TN device having a distance between two glass substrates (cell gap) of 9 μm and a twist angle of 80°. Sine waves (10 V, 1 kHz) were impressed onto the device, and a dielectric constant ($\epsilon\|$) in a major axis direction of a liquid crystal molecule was measured after 2 seconds. Sine waves (0.5 V, 1 kHz) were impressed onto the device, and a dielectric constant ($\epsilon\perp$) in a minor axis direction of a liquid crystal molecule was measured after 2 seconds. A value of a dielectric anisotropy was calculated from the equation: $\Delta \epsilon = \epsilon\| - \epsilon\perp$.

Threshold voltage (Vth; V; measured at 25° C.): Measurement was carried out with LCD Evaluation System Model LCD-5100 made by Otsuka Electronics Co., Ltd. Light source is a halogen lamp. A sample was poured into a TN device of a normally white mode, in which a cell gap between two glass plates was about 0.45/Δn (μm), and a twist angle was 80°. Voltage to be impressed onto the device (32 Hz, rectangular waves) was stepwise increased by 0.02 volt starting from 0 V up to 10 V. During the stepwise increasing, the device was irradiated with light in a perpendicular direction, and an amount of the light passing through the device was measured. Voltage-transmission curve was prepared, in which a maximum amount of a light corresponded to 100% transmittance, a minimum amount of a light corresponded to 0% transmittance. Threshold voltage is a value at 90% transmittance.

Voltage holding ratio (VHR-1; %; measured at 25° C.): ATN device used for measurement has a polyimide-alignient film and the cell gap between two glass plates is 5 μm. A sample was poured into the device, and then the device was sealed with an adhesive which is polymerized by the irradiation of an ultraviolet ray. The TN device was impressed and charged with pulse voltage (60 microseconds at 5 V). Decreasing voltage was measured for 16.7 milliseconds with High Speed Voltmeter and the area A between a voltage curve and a horizontal axis in a unit cycle was obtained. The area B was an area without decreasing. Voltage holding ratio is a percentage of the area A to the area B.

Stability to ultraviolet ray: After irradiation with an ultraviolet ray, a voltage holding ratio (VHR-2; %; measured at 25° C.) and a maximum temperature (NI(UV)) were measured for evaluation of stability to an ultraviolet ray. A composition having large VHR-2 has a high stability to an ultraviolet ray. A TN device used for the measurement has a polyimide-alignient film and the cell gap between two glass plates is 5 μm. A sample was poured into the device, and the device was irradiated with light for 200 minutes. A light source was a superhigh voltage mercury lamp USH-500D (produced by Ushio, Inc.), and a distance between the device and the light source was 20 cm. In the measurement of VHR-2, decreasing voltage was measured for a period of 1,667 milliseconds.

Stability to heat: A TN device having a sample poured therein was heated in a constant-temperature bath at 120° C. for 500 hours, and then a voltage holding ratio (VHR-3; %; 25° C.) and a maximum temperature (NI(H)) were measured for evaluation of stability to heat. A composition having large VHR-3 has a high stability to heat. A composition having a small difference between NI and NI(H) has a high stability to heat. In the measurement of VHR-3, decreasing voltage was measured for a period of 1,667 milliseconds.

Response time (τ; millisecond; measured at 25° C.): Measurement was carried out with LCD Evaluation System Model LCD-5100 made by Otsuka Electronics Co., Ltd. Light source is a halogen lamp. Low-pass filter was set at 5 kHz. A sample was poured into a TN device of a normally white mode, in which a cell gap between two glass plates was 5.0 μm, and a twist angle was 80°. Rectangle waves (60 Hz, 5 V, 0.5 seconds) was impressed to the device. During impressing, the device was irradiated with light in a perpendicular direction, and an amount of the light passing through the device was measured. A maximum amount of a light corresponds to 100% transmittance, and a minimum amount of a light corresponds to 0% transmission. Rise time (τr) is a period of time requited for the change in transmittance from 90% to 10%. Fall time (τf) is a period of time required for the change in transmittance from 10% to 90%. Response time is a sum of the rise time and the fall time thus obtained.

Gas chromatographic Analysis: Gas Chromatograph Model GC-14B made by Shimadzu was used for measurement. Carrier gas is helium (2 milliliters per minute). An evaporator and a detector (FID) were set up at 280° C. and 300° C., respectively. Capillary column DB-1 (length 30 meters, bore 0.32 millimeters, film thickness 0.25 micrometers, dimethylpolysiloxane as stationary phase, no polarity) made by Agilent Technologies, Inc. was used for the separation of the component compound. After the column had been kept at 200° C. for 2 minutes, it was further heated to 280° C. at the rate of 5° C. per minute. A sample was prepared into an acetone solution (0.1% by weight), and 1 microliter of the solution was injected into the evaporator. The recorder used was Chromatopac Model C-R5A made by Shimadzu or its equivalent. Gas chromatogram obtained showed a retention time of a peak and a peak area corresponding to the component compound.

Solvents for diluting the sample may also be chloroform, hexane, and so forth. The following capillary columns may also be used for the separation of the component compound: HP-1 made by Agilent Technologies Inc. (length 30 meters, bore 0.32 millimeters, film thickness 0.25 micrometers), Rtx-1 made by Restek Corporation (length 30 meters, bore 0.32 millimeters, film thickness 0.25 micrometers), and BP-1 made by SGE International Pty. Ltd. (length 30 meters, bore 0.32 millimeters, film thickness 0.25 micrometers). In order to prevent compound peaks from overlapping, a capillary column CBPI-M50-025 (length 50 meters, bore 0.25 millimeters, film thickness 0.25 micrometers) made by Shimadzu Corporation may be used. An area ratio of each peak in the gas chromatogram corresponds to a ratio of the component compound. Percentage by weight of the component compound is not completely identical to an area ratio of each peak. According to the invention, however, percentage by weight of the component compound may be regarded to be identical to an area ratio of each peak, when these capillary columns are used. This is because there is no significant difference in correction efficient of component compounds.

Comparative Example 1

Example 1 was chosen from the compositions disclosed in JP 2003-301178 A /2003. The basis is that the composition contains the compounds (2), (3) and (4), and has the largest optical anisotropy and a high stability to an ultraviolet ray. The components and characteristics of the composition are as follows.

| 3-HBB(F,F)-F | (2-1-1) | 13% |
|---|---|---|
| 2-BB(2F,5F)B-2 | (3-1-3) | 7% |
| 3-BB(2F,5F)B-3 | (3-1-3) | 10% |
| 3-BB(F,F)XB(F,F)-F | (4-1) | 13% |
| 3-BB(F,F)XB(F)-OCF3 | (4-4) | 2% |
| 2-BBB(2F,5F)B(2F)-5 | (—) | 2% |
| 3-BBB(2F,5F)B(2F)-5 | (—) | 3% |
| 2-BBB(2F,5F)B(F)-5 | (—) | 2% |
| 3-BBB(2F,5F)B(F)-5 | (—) | 3% |
| 2-BB(F)B(2F,5F)B-5 | (—) | 2% |
| 3-BB(F)B(2F,5F)B-5 | (—) | 3% |
| 2-BB(2F)B(2F,5F)B-5 | (—) | 2% |
| 3-BB(2F)B(2F,5F)B-5 | (—) | 3% |
| 3-BB(F,F)XB-OCF3 | (—) | 3% |
| 3-HB(F,F)XB(F,F)-F | (—) | 2% |
| 2-HBB(F)-F | (—) | 7.5% |
| 3-HBB(F)-F | (—) | 7.5% |
| 5-HBB(F)-F | (—) | 15% |

NI = 92.9° C.; $T_C \leq -30°$ C.; Δn = 0.194; Δε = 9.2; γ1 = 236.4 mPa · s; Vth = 1.32 V; VHR-1 = 99.2%; VHR-2 = 49.8%; VHR-3 = 96.1%; NI(UV) = 92.2° C.; NI(H) = 92.4° C.

Comparative Example 2

Example 2 was chosen from the compositions disclosed in WO 2004/035710. The basis is that the composition has the largest optical anisotropy. The components and characteristics of the composition are as follows.

| | | |
|---|---|---|
| 3-HBB(F,F)-F | (2-1-1) | 9% |
| 5-HBB(F,F)-F | (2-1-1) | 10% |
| 3-HBB(F)-F | (—) | 4% |
| 5-HBB(F)-F | (—) | 5% |
| 3-B(F)B(F)B-CL | (—) | 9% |
| 5-B(F)B(F)B-CL | (—) | 24% |
| 3-BB(2F)B(2F)-F | (—) | 4% |
| V-HHB(F)-F | (—) | 6% |
| 2-BB(F)B(F,F)-F | (—) | 6% |
| 3-BB(F)B(F,F)-F | (—) | 7% |
| 2-B(F)B2B-CL | (—) | 5% |
| 3-B(F)B2B-CL | (—) | 4% |
| 3-HB(F)BH-3 | (—) | 3% |
| 5-HB(F)BH-3 | (—) | 4% |

NI = 99.9° C.; $T_C \leq$ −20° C.; $\Delta n$ = 0.197; $\Delta \epsilon$ = 11.6; $\gamma 1$ = 310.7 mPa · s; Vth = 1.18 V; VHR-1 = 98.9%; VHR-2 = 76.8%; VHR-3 = 96.8%; NI(UV) = 99.5° C.; NI(H) = 99.8° C.

Comparative Example 3

Example 31 was chosen from the compositions disclosed in WO 2005/007775. The basis is that the composition has the largest optical anisotropy. The components and characteristics of the composition are as follows.

| | | |
|---|---|---|
| 2-BB(F)B-3 | (3-1-1) | 16% |
| 2-BB(F)B-4 | (3-1-1) | 16% |
| 3-BB(F)B-2 | (3-1-1) | 11% |
| 3-HB-O1 | (—) | 9% |
| 2-B(F)B(F)B-F | (—) | 9% |
| 3-B(F)B(F)B-F | (—) | 10% |
| 5-B(F)B(F)B-F | (—) | 6% |
| 3-HB(F)B(F)-F | (—) | 18% |
| 1-BB-2V1 | (—) | 5% |

NI = 87.7° C.; $T_C \leq$ 0° C.; $\Delta n$ = 0.208; $\Delta \epsilon$ = 4.5; Vth = 1.87 V; VHR-1 = 99.1%; VHR-2 = 89.8%; VHR-3 = 97.5%; NI(UV) = 87.2° C.; NI(H) = 87.2° C.

Example 1

The composition of Example 1 had a larger optical anisotropy and a higher stability to an ultraviolet ray (VHR-2) as compared to the composition of Comparative Example 1.

| | | |
|---|---|---|
| 3-BB(F,F)B-F | (1-1) | 9% |
| 4-BB(F,F)B-F | (1-1) | 9% |
| 5-BB(F,F)B-F | (1-1) | 8% |
| 2-HBB(F,F)-F | (2-1-1) | 6% |
| 3-HBB(F,F)-F | (2-1-1) | 16% |
| 2-HHBB(F,F)-F | (2-2-1) | 3% |
| 3-HHBB(F,F)-F | (2-2-1) | 3% |
| 2-BBB(2F)-3 | (3-1-2) | 5% |
| 2-BBB(2F)-5 | (3-1-2) | 5% |
| 5-BBB(2F)-2 | (3-1-2) | 5% |
| 2-BB(2F,5F)B-3 | (3-1-3) | 9% |
| 3-BB(2F,5F)B-3 | (3-1-3) | 9% |
| 5-HBB(F)B-2 | (3-2-2) | 3% |
| 2-BBB(F)B-5 | (3-2-3) | 4% |
| 3-BB(F,F)XB(F,F)-F | (4-1) | 6% |

NI = 105.6° C.; $T_C \leq$ −10° C.; $\Delta n$ = 0.209; $\Delta \epsilon$ = 9.2; $\gamma 1$ = 235.3 mPa · s; Vth = 1.32 V; VHR-1 = 99.3%; VHR-2 = 83.3%; VHR-3 = 97.1%; NI(UV) = 105.2° C.; NI(H) = 105.3° C.

Example 2

The composition of Example 2 had a larger optical anisotropy and a higher stability to an ultraviolet ray (VHR-2) as compared to the composition of Comparative Example 2.

| | | |
|---|---|---|
| 3-BB(F,F)B-F | (1-1) | 10% |
| 4-BB(F,F)B-F | (1-1) | 10% |
| 5-BB(F,F)B-F | (1-1) | 10% |
| 3-HBB(F,F)-F | (2-1-1) | 8% |
| 3-HB(F)B(F,F)-F | (2-1-3) | 8% |
| 2-BB(F)B-3 | (3-1-1) | 10% |
| 2-BB(F)B-5 | (3-1-1) | 10% |
| 2-BB(2F,5F)B-3 | (3-1-3) | 8% |
| 3-BB(2F,5F)B-3 | (3-1-3) | 4% |
| 5-HBBB-3 | (3-2-1) | 6% |
| 5-HBB(F)B-2 | (3-2-2) | 8% |
| 5-HBB(F)B-3 | (3-2-2) | 8% |

NI = 127.6° C.; $T_C \leq$ −10° C.; $\Delta n$ = 0.230; $\Delta \epsilon$ = 7.3; Vth = 1.55 V; VHR-1 = 99.6%; VHR-2 = 96.0%; VHR-3 = 97.1%; NI(UV) = 127.5° C.; NI(H) = 127.4° C.

Example 3

The composition of Example 3 had a larger optical anisotropy, a larger dielectric anisotropy and a higher stability to an ultraviolet ray (VHR-2) as compared to the composition of Comparative Example 3.

| | | |
|---|---|---|
| 3-BB(F,F)B-F | (1-1) | 15% |
| 5-BB(F,F)B-F | (1-1) | 15% |
| 2-HBB(F,F)-F | (2-1-1) | 5% |
| 3-HBB(F,F)-F | (2-1-1) | 10% |
| 3-HB(F)B(F,F)-F | (2-1-3) | 10% |
| 2-BB(F)B-3 | (3-1-1) | 11% |
| 2-BB(F)B-5 | (3-1-1) | 10% |
| 5-HBB(F)B-2 | (3-2-2) | 12% |
| 5-HBB(F)B-3 | (3-2-2) | 12% |

NI = 128.1° C.; $T_C \leq$ −10° C.; $\Delta n$ = 0.225; $\Delta \epsilon$ = 7.9; Vth = 1.50 V; VHR-1 = 99.4%; VHR-2 = 96.2%; VHR-3 = 97.0%; NI(UV) = 127.9° C.; NI(H) = 128.1° C.

Example 4

| | | |
|---|---|---|
| 3-BB(F,F)B-F | (1-1) | 8% |
| 4-BB(F,F)B-F | (1-1) | 8% |
| 5-BB(F,F)B-F | (1-1) | 8% |
| 2-HBB(F,F)-F | (2-1-1) | 8% |
| 3-HBB(F,F)-F | (2-1-1) | 14% |
| 5-HBB(F,F)-F | (2-1-1) | 10% |
| 3-H2BB(F,F)-F | (2-1-2) | 5% |
| 3-HB(F)B(F,F)-F | (2-1-3) | 8% |
| 2-HHBB(F,F)-F | (2-2-1) | 5% |
| 3-HHBB(F,F)-F | (2-2-1) | 5% |
| 3-HH2BB(F,F)-F | (2-2-2) | 4% |
| 3-BB(2F,5F)B-3 | (3-1-3) | 7% |

-continued

| | | |
|---|---|---|
| 5-HBB(F)B-2 | (3-2-2) | 5% |
| 5-HBB(F)B-3 | (3-2-2) | 5% |

NI = 109.4° C.; $T_C \leq -10°$ C.; $\Delta n$ = 0.179; $\Delta\epsilon$ = 9.4; Vth = 1.59 V; VHR-1 = 99.4%; VHR-2 = 96.1%; VHR-3 = 97.0%; NI(UV) = 109.1° C.; NI(H) = 109.1° C.

Example 5

| | | |
|---|---|---|
| 2-BB(F,F)B-F | (1-1) | 5% |
| 3-BB(F,F)B-F | (1-1) | 5% |
| 4-BB(F,F)B-F | (1-1) | 5% |
| 5-BB(F,F)B-F | (1-1) | 5% |
| 2-HBB(F,F)-F | (2-1-1) | 9% |
| 3-HBB(F,F)-F | (2-1-1) | 28% |
| 4-HBB(F,F)-F | (2-1-1) | 5% |
| 5-HBB(F,F)-F | (2-1-1) | 5% |
| 2-HHBB(F,F)-F | (2-2-1) | 5% |
| 3-HHBB(F,F)-F | (2-2-1) | 5% |
| 2-BB(F)B-3 | (3-1-1) | 5% |
| 2-BB(F)B-5 | (3-1-1) | 5% |
| 2-BB(2F,5F)B-3 | (3-1-3) | 5% |
| 5-HBB(F)B-2 | (3-2-2) | 4% |
| 5-HBB(F)B-3 | (3-2-2) | 4% |

NI = 107.4° C.; $T_C \leq -20°$ C.; $\Delta n$ = 0.180; $\Delta\epsilon$ = 8.5; $\gamma1$ = 239.9 mPa·s; Vth = 1.38 V; VHR-1 = 99.0%; VHR-2 = 95.0%; VHR-3 = 97.0%; NI(UV) = 106.9° C.; NI(H) = 107.2° C.

Example 6

| | | |
|---|---|---|
| 3-BB(F,F)B-CL | (1-2) | 7% |
| 4-BB(F,F)B-CL | (1-2) | 7% |
| 5-BB(F,F)B-CL | (1-2) | 6% |
| 2-HBB(F,F)-F | (2-1-1) | 9% |
| 3-HBB(F,F)-F | (2-1-1) | 28% |
| 4-HBB(F,F)-F | (2-1-1) | 5% |
| 5-HBB(F,F)-F | (2-1-1) | 5% |
| 2-HHBB(F,F)-F | (2-2-1) | 5% |
| 3-HHBB(F,F)-F | (2-2-1) | 5% |
| 2-BB(F)B-3 | (3-1-1) | 5% |
| 2-BB(F)B-5 | (3-1-1) | 5% |
| 2-BB(2F,5F)B-3 | (3-1-3) | 5% |
| 5-HBB(F)B-2 | (3-2-2) | 4% |
| 5-HBB(F)B-3 | (3-2-2) | 4% |

NI = 112.8° C.; $T_C \leq -20°$ C.; $\Delta n$ = 0.190; $\Delta\epsilon$ = 8.8; $\gamma1$ = 245.8 mPa·s; Vth = 1.38 V; VHR-1 = 98.9%; VHR-2 = 86.0%; VHR-3 = 97.0%; NI(UV) = 112.4° C.; NI(H) = 112.4° C.

Example 7

| | | |
|---|---|---|
| 3-BB(F,F)B-F | (1-1) | 5% |
| 5-BB(F,F)B-F | (1-1) | 5% |
| V2-BB(F,F)B-F | (1-1) | 5% |
| 1V2-BB(F,F)B-F | (1-1) | 5% |
| 2-HBB(F,F)-F | (2-1-1) | 9% |
| 3-HBB(F,F)-F | (2-1-1) | 28% |
| 4-HBB(F,F)-F | (2-1-1) | 5% |
| 5-HBB(F,F)-F | (2-1-1) | 5% |
| 2-HHBB(F,F)-F | (2-2-1) | 5% |
| 3-HHBB(F,F)-F | (2-2-1) | 5% |
| 2-BB(F)B-3 | (3-1-1) | 5% |
| 2-BB(F)B-5 | (3-1-1) | 5% |

-continued

| | | |
|---|---|---|
| 2-BB(2F,5F)B-3 | (3-1-3) | 5% |
| 5-HBB(F)B-2 | (3-2-2) | 4% |
| 5-HBB(F)B-3 | (3-2-2) | 4% |

NI = 109.4° C.; $T_C \leq -20°$ C.; $\Delta n$ = 0.182; $\Delta\epsilon$ = 8.6; $\gamma1$ = 237.9 mPa·s; Vth = 1.38 V; VHR-1 = 99.0%; VHR-2 = 90.5%; VHR-3 = 97.0%; NI(UV) = 108.8° C.; NI(H) = 109.0° C.

Example 8

| | | |
|---|---|---|
| 3-BB(F,F)B-F | (1-1) | 10% |
| 5-BB(F,F)B-F | (1-1) | 10% |
| 2-HBB(F,F)-F | (2-1-1) | 9% |
| 3-HBB(F,F)-F | (2-1-1) | 15% |
| 4-HBB(F,F)-F | (2-1-1) | 5% |
| 5-HBB(F,F)-F | (2-1-1) | 5% |
| 5-H2BB(F,F)-F | (2-1-2) | 5% |
| 3-HB(F)B(F,F)-F | (2-1-3) | 8% |
| 3-HHBB(F,F)-F | (2-2-1) | 5% |
| 3-HHB(F)B(F,F)-F | (2-2-3) | 5% |
| 2-BBB(2F)-3 | (3-1-2) | 5% |
| 2-BBB(2F)-5 | (3-1-2) | 5% |
| 3-BB(2F,5F)B-3 | (3-1-3) | 5% |
| 5-HBBB-3 | (3-2-1) | 2% |
| 3-HBB(F)B-2 | (3-2-2) | 3% |
| 5-HBB(F)B-3 | (3-2-2) | 3% |

NI = 106.4° C.; $T_C \leq -20°$ C.; $\Delta n$ = 0.179; $\Delta\epsilon$ = 9.2; $\gamma1$ = 237.4 mPa·s; Vth = 1.33 V; VHR-1 = 99.1%; VHR-2 = 95.0%; VHR-3 = 96.9%; NI(UV) = 105.9° C.; NI(H) = 106.1° C.

Example 9

| | | |
|---|---|---|
| 3-BB(F,F)B-F | (1-1) | 5% |
| 5-BB(F,F)B-F | (1-1) | 5% |
| 3-BB(F,F)B-CL | (1-2) | 5% |
| 5-BB(F,F)B-CL | (1-2) | 5% |
| 2-HBB(F,F)-F | (2-1-1) | 9% |
| 3-HBB(F,F)-F | (2-1-1) | 28% |
| 4-HBB(F,F)-F | (2-1-1) | 5% |
| 5-HBB(F,F)-F | (2-1-1) | 5% |
| 2-HHBB(F,F)-F | (2-2-1) | 5% |
| 3-HHBB(F,F)-F | (2-2-1) | 5% |
| 2-BBB(2F)-3 | (3-1-2) | 5% |
| 2-BBB(2F)-5 | (3-1-2) | 5% |
| 3-BB(2F,5F)B-3 | (3-1-3) | 5% |
| 3-HBB(F)B-2 | (3-2-2) | 4% |
| 5-HBB(F)B-3 | (3-2-2) | 4% |

NI = 110.1° C.; $T_C \leq -20°$ C.; $\Delta n$ = 0.185; $\Delta\epsilon$ = 8.7; $\gamma1$ = 242.9 mPa·s; Vth = 1.38 V; VHR-1 = 98.8%; VHR-2 = 90.7%; VHR-3 = 97.0%; NI(UV) = 109.6° C.; NI(H) = 109.7° C.

Example 10

| | | |
|---|---|---|
| 3-BB(F,F)B-F | (1-1) | 10% |
| 5-BB(F,F)B-F | (1-1) | 10% |
| 3-BB(F,F)B-CL | (1-2) | 5% |
| 5-BB(F,F)B-CL | (1-2) | 4% |
| 2-HBB(F,F)-F | (2-1-1) | 5% |
| 3-HBB(F,F)-F | (2-1-1) | 20% |
| 4-HBB(F,F)-F | (2-1-1) | 5% |
| 5-HBB(F,F)-F | (2-1-1) | 5% |
| 3-HB(F)B(F,F)-F | (2-1-3) | 5% |

-continued

| | | |
|---|---|---|
| 2-HHBB(F,F)-F | (2-2-1) | 5% |
| 3-HHBB(F,F)-F | (2-2-1) | 5% |
| 4-HHBB(F,F)-F | (2-2-1) | 5% |
| 5-HHBB(F,F)-F | (2-2-1) | 5% |
| 3-HHB(F)B(F,F)-F | (2-2-3) | 5% |
| 2-BB(2F,5F)B-3 | (3-1-3) | 5% |

NI = 109.9° C.; $T_C \leq -10°$ C.; $\Delta n$ = 0.175; $\Delta\epsilon$ = 10.5; $\gamma1$ = 277.6 mPa · s; Vth = 1.25 V; VHR-1 = 98.8%; VHR-2 = 91.2%; VHR-3 = 97.0%; NI(UV) = 109.4° C.; NI(H) = 109.4° C.

Example 11

| | | |
|---|---|---|
| 3-BB(F,F)B-F | (1-1) | 4% |
| 5-BB(F,F)B-F | (1-1) | 4% |
| 2-HBB(F,F)-F | (2-1-1) | 10% |
| 3-HBB(F,F)-F | (2-1-1) | 20% |
| 3-HB(F)B(F,F)-F | (2-1-3) | 5% |
| 3-H2B(F)B(F,F)-F | (2-1-4) | 5% |
| 3-BB(F)B-5 | (3-1-1) | 5% |
| 2-BBB(2F)-5 | (3-1-2) | 5% |
| 5-BBB(2F)-2 | (3-1-2) | 5% |
| 2-BB(2F,5F)B-2 | (3-1-3) | 5% |
| 3-BB(2F,5F)B-3 | (3-1-3) | 10% |
| 5-HBBB-3 | (3-2-1) | 3% |
| 5-HBB(F)B-2 | (3-2-2) | 10% |
| 5-HBB(F)B-3 | (3-2-2) | 9% |

NI = 122.4° C.; $T_C \leq -30°$ C.; $\Delta n$ = 0.201; $\Delta\epsilon$ = 6.6; $\gamma1$ = 229.6 mPa · s; Vth = 1.62 V; VHR-1 = 98.9%; VHR-2 = 95.4%; NI(UV) = 121.6° C.

Example 12

| | | |
|---|---|---|
| 3-BB(F,F)B-F | (1-1) | 6% |
| 4-BB(F,F)B-F | (1-1) | 5% |
| 5-BB(F,F)B-F | (1-1) | 5% |
| 3-BB(F,F)B-CL | (1-2) | 4% |
| 2-HBB(F,F)-F | (2-1-1) | 9% |
| 3-HBB(F,F)-F | (2-1-1) | 20% |
| 4-HBB(F,F)-F | (2-1-1) | 5% |
| 5-HBB(F,F)-F | (2-1-1) | 5% |
| 2-BB(F)B-3 | (3-1-1) | 5% |
| 2-BB(F)B-5 | (3-1-1) | 5% |
| 2-BB(2F,5F)B-3 | (3-1-3) | 5% |
| 3-HBB-F | (—) | 4% |
| 2-HBB(F)-F | (—) | 4% |
| 3-HBB(F)-F | (—) | 4% |
| 3-H2BB(F)-F | (—) | 4% |

NI = 99.4° C.; $T_C \leq -20°$ C.; $\Delta n$ = 0.175; $\Delta\epsilon$ = 8.6; $\gamma1$ = 226.3 mPa · s; Vth = 1.35 V; VHR-1 = 98.9%; VHR-2 = 93.6%; NI(UV) = 98.7° C.

Example 13

| | | |
|---|---|---|
| 3-BB(F,F)B-F | (1-1) | 8% |
| 5-BB(F,F)B-F | (1-1) | 8% |
| 1V2-BB(F,F)B-F | (1-1) | 4% |
| 2-HBB(F,F)-F | (2-1-1) | 9% |
| 3-HBB(F,F)-F | (2-1-1) | 20% |
| 4-HBB(F,F)-F | (2-1-1) | 5% |
| 5-HBB(F,F)-F | (2-1-1) | 5% |
| 2-HHBB(F,F)-F | (2-2-1) | 5% |
| 3-HHBB(F,F)-F | (2-2-1) | 5% |
| 2-BB(F)B-3 | (3-1-1) | 3% |
| 2-BB(F)B-5 | (3-1-1) | 5% |
| 3-BB(2F,5F)B-3 | (3-1-3) | 5% |
| 5-HBB(F)B-2 | (3-2-2) | 4% |
| 5-HBB(F)B-3 | (3-2-2) | 4% |
| 3-BB(F)B(F,F)-F | (—) | 10% |

NI = 105.9° C.; $T_C \leq -20°$ C.; $\Delta n$ = 0.185; $\Delta\epsilon$ = 9.7; $\gamma1$ = 245.3 mPa · s; Vth = 1.29 V; VHR-1 = 99.3%; VHR-2 = 94.0%; NI(UV) = 98.7° C.

Example 14

| | | |
|---|---|---|
| 3-BB(F,F)B-F | (1-1) | 5% |
| 5-BB(F,F)B-F | (1-1) | 5% |
| 3-BB(F,F)B-CL | (1-2) | 4% |
| 5-BB(F,F)B-CL | (1-2) | 4% |
| 2-HBB(F,F)-F | (2-1-1) | 5% |
| 3-HBB(F,F)-F | (2-1-1) | 20% |
| 2-HB(F)B(F,F)-F | (2-1-3) | 5% |
| 3-HB(F)B(F,F)-F | (2-1-3) | 5% |
| 2-HHB(F)B(F,F)-F | (2-2-3) | 3% |
| 3-HHB(F)B(F,F)-F | (2-2-3) | 4% |
| 2-BB(2F,5F)B-3 | (3-1-3) | 5% |
| 2-BB(2F,5F)B-4 | (3-1-3) | 5% |
| 5-HBB(F)B-2 | (3-2-2) | 2% |
| 3-HB-CL | (—) | 5% |
| 2-HBB-F | (—) | 5% |
| 3-HBB-F | (—) | 5% |
| 5-HBB-F | (—) | 5% |
| 3-BB(F)B(F,F)-F | (—) | 4% |
| 5-BB(F)B(F,F)-F | (—) | 4% |

NI = 92.4° C.; $T_C \leq -20°$ C.; $\Delta n$ = 0.174; $\Delta\epsilon$ = 9.7; $\gamma1$ = 208.7 mPa · s; Vth = 1.25 V; VHR-1 = 99.0%; VHR-2 = 88.8%; NI(UV) = 91.9° C.

Example 15

| | | |
|---|---|---|
| 2-BB(F,F)B-F | (1-1) | 6% |
| 3-BB(F,F)B-F | (1-1) | 6% |
| 4-BB(F,F)B-F | (1-1) | 6% |
| 5-BB(F,F)B-F | (1-1) | 6% |
| 2-HBB(F,F)-F | (2-1-1) | 5% |
| 3-HBB(F,F)-F | (2-1-1) | 20% |
| 3-HB(F)B(F,F)-F | (2-1-3) | 10% |
| 3-HHB(F)B(F,F)-F | (2-2-3) | 7% |
| 3-BBB(2F)-4 | (3-1-2) | 5% |
| 3-BB(2F,5F)B-5 | (3-1-3) | 5% |
| 5-HBB(F)B-2 | (3-2-2) | 6% |
| 5-HBB(F)B-3 | (3-2-2) | 4% |
| 7-HB-1 | (—) | 5% |
| 3-HHB(F,F)-F | (—) | 3% |
| 3-HHB-CL | (—) | 3% |
| 5-HHB-CL | (—) | 3% |

NI = 108.7° C.; $T_C \leq -10°$ C.; $\Delta n$ = 0.175; $\Delta\epsilon$ = 8.6; $\gamma1$ = 217.1 mPa · s; Vth = 1.39 V; VHR-1 = 99.0%; VHR-2 = 92.3%; NI(UV) = 108.2° C.

Example 16

| | | |
|---|---|---|
| 3-BB(F,F)B-F | (1-1) | 8% |
| 5-BB(F,F)B-F | (1-1) | 5% |
| 1V2-BB(F,F)B-F | (1-1) | 5% |
| 2-HBB(F,F)-F | (2-1-1) | 5% |
| 3-HBB(F,F)-F | (2-1-1) | 10% |
| 4-HBB(F,F)-F | (2-1-1) | 5% |

-continued

| | | |
|---|---|---|
| 5-HBB(F,F)-F | (2-1-1) | 5% |
| 3-H2BB(F,F)-F | (2-1-2) | 5% |
| 4-H2BB(F,F)-F | (2-1-2) | 5% |
| 5-H2BB(F,F)-F | (2-1-2) | 5% |
| 3-HB(F)B(F,F)-F | (2-1-3) | 5% |
| 3-HHBB(F,F)-F | (2-2-1) | 5% |
| 3-HH2B(F)B(F,F)-F | (2-2-4) | 5% |
| 3-BB(2F,5F)B-3 | (3-1-3) | 7% |
| 3-BB-F | (—) | 5% |
| 3-HBBH-4 | (—) | 5% |
| 5-HB(F)BH-3 | (—) | 5% |
| 3-BB(F)B(F,F)-F | (—) | 5% |

NI = 110.8° C.; $T_C \leq -20°$ C.; $\Delta n$ = 0.168; $\Delta \epsilon$ = 9.3; $\gamma 1$ = 243.5 mPa · s; Vth = 1.34 V; VHR-1 = 98.9%; VHR-2 = 92.7%; NI(UV) = 110.4° C.

Example 17

| | | |
|---|---|---|
| 3-BB(F,F)B-F | (1-1) | 8% |
| 5-BB(F,F)B-F | (1-1) | 8% |
| V2-BB(F,F)B-F | (1-1) | 4% |
| 2-HBB(F,F)-F | (2-1-1) | 9% |
| 3-HBB(F,F)-F | (2-1-1) | 23% |
| 4-HBB(F,F)-F | (2-1-1) | 5% |
| 2-BB(F)B-3 | (3-1-1) | 5% |
| 2-BB(F)B-5 | (3-1-1) | 5% |
| 3-BB(2F,5F)B-3 | (3-1-3) | 5% |
| 5-HBB(F)B-2 | (3-2-2) | 4% |
| 5-HBB(F)B-3 | (3-2-2) | 4% |
| 3-HNpB(F,F)-F | (—) | 10% |
| 3-HNp(F)B(F,F)-F | (—) | 10% |

NI = 105.6° C.; $T_C \leq -20°$ C.; $\Delta n$ = 0.189; $\Delta \epsilon$ = 8.8; $\gamma 1$ = 316.9 mPa · s; Vth = 1.35 V; VHR-1 = 99.2%; VHR-2 = 93.3%; NI(UV) = 105.0° C.

Example 18

| | | |
|---|---|---|
| 3-BB(F,F)B-F | (1-1) | 6% |
| 5-BB(F,F)B-F | (1-1) | 6% |
| 2-HBB(F,F)-F | (2-1-1) | 10% |
| 3-HBB(F,F)-F | (2-1-1) | 20% |
| 4-HBB(F,F)-F | (2-1-1) | 5% |
| 5-HBB(F,F)-F | (2-1-1) | 5% |
| 3-H2BB(F,F)-F | (2-1-2) | 5% |
| 2-HHBB(F,F)-F | (2-2-1) | 3% |
| 3-HHBB(F,F)-F | (2-2-1) | 3% |
| 4-HHBB(F,F)-F | (2-2-1) | 3% |
| 3-HH2BB(F,F)-F | (2-2-2) | 3% |
| 2-BB(2F,5F)B-2 | (3-1-3) | 3% |
| 3-BB(2F,5F)B-3 | (3-1-3) | 10% |
| 5-HBB(F)B-2 | (3-2-2) | 3% |
| 5-HBB(F)B-3 | (3-2-2) | 3% |
| 3-HHB(F)-F | (—) | 3% |
| 1O1-HBBH-3 | (—) | 3% |
| 1O1-HBBH-4 | (—) | 3% |
| 1O1-HBBH-5 | (—) | 3% |

NI = 121.6° C.; $T_C \leq -30°$ C.; $\Delta n$ = 0.172; $\Delta \epsilon$ = 7.5; $\gamma 1$ = 257.0 mPa · s; Vth = 1.52 V; VHR-1 = 99.1%; VHR-2 = 92.5%; NI(UV) = 121.1° C.

Example 19

| | | |
|---|---|---|
| 3-BB(F,F)B-F | (1-1) | 7% |
| 4-BB(F,F)B-F | (1-1) | 7% |

-continued

| | | |
|---|---|---|
| 5-BB(F,F)B-F | (1-1) | 6% |
| 3-BB(F,F)B-CL | (1-2) | 5% |
| 5-BB(F,F)B-CL | (1-2) | 5% |
| 2-HBB(F,F)-F | (2-1-1) | 10% |
| 3-HBB(F,F)-F | (2-1-1) | 32% |
| 4-HBB(F,F)-F | (2-1-1) | 5% |
| 5-HBB(F,F)-F | (2-1-1) | 5% |
| 3-HB(F)B(F,F)-F | (2-1-3) | 5% |
| 5-HBB(F)B-2 | (3-2-2) | 7% |
| 5-HBB(F)B-3 | (3-2-2) | 6% |

NI = 97.8° C.; $T_C \leq -10°$ C.; $\Delta n$ = 0.178; $\Delta \epsilon$ = 9.6; $\gamma 1$ = 238.6 mPa · s; Vth = 1.27 V; VHR-1 = 99.0%; VHR-2 = 90.0%; NI(UV) = 97.1° C.

Example 20

| | | |
|---|---|---|
| 3-BB(F,F)B-F | (1-1) | 8% |
| 5-BB(F,F)B-F | (1-1) | 8% |
| V2-BB(F,F)B-F | (1-1) | 4% |
| 1V2-BB(F,F)B-F | (1-1) | 4% |
| V2-BB(F,F)B-CL | (1-2) | 5% |
| 2-HHBB(F,F)-F | (2-2-1) | 7% |
| 3-HHBB(F,F)-F | (2-2-1) | 6% |
| 4-HHBB(F,F)-F | (2-2-1) | 6% |
| 5-HHBB(F,F)-F | (2-2-1) | 6% |
| 3-HHB(F)B(F,F)-F | (2-2-3) | 5% |
| 2-BB(F)B-3 | (3-1-1) | 5% |
| 2-BBB(2F)-3 | (3-1-2) | 5% |
| 2-BBB(2F)-5 | (3-1-2) | 5% |
| 5-BBB(2F)-2 | (3-1-2) | 5% |
| 2-BB(2F,5F)B-2 | (3-1-3) | 5% |
| 3-BB(2F,5F)B-3 | (3-1-3) | 10% |
| 3-HB-CL | (—) | 6% |

NI = 130.9° C.; $T_C \leq -10°$ C.; $\Delta n$ = 0.211; $\Delta \epsilon$ = 8.5; $\gamma 1$ = 252.5 mPa · s; Vth = 1.44 V; VHR-1 = 98.7%; VHR-2 = 86.5%; NI(UV) = 130.1° C.

Example 21

| | | |
|---|---|---|
| 2-BB(F,F)B-F | (1-1) | 6% |
| 3-BB(F,F)B-F | (1-1) | 6% |
| 4-BB(F,F)B-F | (1-1) | 6% |
| 5-BB(F,F)B-F | (1-1) | 6% |
| 2-HBB(F,F)-F | (2-1-1) | 10% |
| 3-HBB(F,F)-F | (2-1-1) | 17% |
| 4-HBB(F,F)-F | (2-1-1) | 7% |
| 5-HBB(F,F)-F | (2-1-1) | 7% |
| 3-HB(F)B(F,F)-F | (2-1-3) | 7% |
| 2-HHBB(F,F)-F | (2-2-1) | 7% |
| 3-HHBB(F,F)-F | (2-2-1) | 7% |
| 3-HHB(F)B(F,F)-F | (2-2-3) | 4% |
| 2-BB(F)B(F,F)-F | (—) | 3% |
| 3-BB(F)B(F,F)-F | (—) | 4% |
| 4-BB(F)B(F,F)-F | (—) | 3% |

NI = 92.4° C.; $T_C \leq -10°$ C.; $\Delta n$ = 0.163; $\Delta \epsilon$ = 11.9; $\gamma 1$ = 258.0 mPa · s; Vth = 1.13 V; VHR-1 = 99.4%; VHR-2 = 94.9%; NI(UV) = 92.3° C.

Example 22

| | | |
|---|---|---|
| 3-BB(F,F)B-F | (1-1) | 10% |
| 5-BB(F,F)B-F | (1-1) | 10% |
| 2-HBB(F,F)-F | (2-1-1) | 9% |
| 3-HBB(F,F)-F | (2-1-1) | 28% |

-continued

| | | |
|---|---|---|
| 4-HBB(F,F)-F | (2-1-1) | 5% |
| 5-HBB(F,F)-F | (2-1-1) | 5% |
| 2-HHBB(F,F)-F | (2-2-1) | 5% |
| 3-HHBB(F,F)-F | (2-2-1) | 5% |
| 2-BB(F)B-3 | (3-1-1) | 5% |
| 2-BB(F)B-5 | (3-1-1) | 5% |
| 2-BB(2F,5F)B-3 | (3-1-3) | 5% |
| 2-BBB(F)B-3 | (3-2-3) | 5% |
| 3-BBBB-5 | (3-2-4) | 3% |

NI = 107.0° C.; $T_C \leqq -20°$ C.; $\Delta n = 0.187$; $\Delta \epsilon = 8.9$; $\gamma 1 = 247.4$ mPa · s; Vth = 1.35 V; VHR-1 = 98.9%; VHR-2 = 95.3%; NI(UV) = 106.3° C.

Example 23

| | | |
|---|---|---|
| 3-BB(F,F)B-F | (1-1) | 10% |
| 5-BB(F,F)B-F | (1-1) | 10% |
| 3-BB(F,F)B-CL | (1-2) | 5% |
| 2-HBB(F,F)-F | (2-1-1) | 5% |
| 3-HBB(F,F)-F | (2-1-1) | 30% |
| 4-HBB(F,F)-F | (2-1-1) | 8% |
| 3-HB(F)B(F,F)-F | (2-1-3) | 5% |
| 2-HHBB(F,F)-F | (2-2-1) | 3% |
| 3-HHBB(F,F)-F | (2-2-1) | 3% |
| 4-HHBB(F,F)-F | (2-2-1) | 3% |
| 5-HBBB-3 | (3-2-1) | 3% |
| 5-HBB(F)B-3 | (3-2-2) | 7% |
| 2-BBB(F)B-3 | (3-2-3) | 6% |
| 3-BBBB-4 | (3-2-4) | 2% |

NI = 116.9° C.; $T_C \leqq -10°$ C.; $\Delta n = 0.189$; $\Delta \epsilon = 9.7$; $\gamma 1 = 267.3$ mPa · s; Vth = 1.32 V; VHR-1 = 99.2%; VHR-2 = 92.6%; NI(UV) = 116.3° C.

Example 24

| | | |
|---|---|---|
| 3-BB(F,F)B-F | (1-1) | 8% |
| 5-BB(F,F)B-F | (1-1) | 8% |
| 2-HBB(F,F)-F | (2-1-1) | 5% |
| 3-HBB(F,F)-F | (2-1-1) | 5% |
| 4-HBB(F,F)-F | (2-1-1) | 5% |
| 5-HBB(F,F)-F | (2-1-1) | 5% |
| 3-H2BB(F,F)-F | (2-1-2) | 5% |
| 4-H2BB(F,F)-F | (2-1-2) | 5% |
| 5-H2BB(F,F)-F | (2-1-2) | 5% |
| 3-HB(F)B(F,F)-F | (2-1-3) | 5% |
| 2-HHBB(F,F)-F | (2-2-1) | 3% |
| 3-HHBB(F,F)-F | (2-2-1) | 3% |
| 3-HH2BB(F,F)-F | (2-2-2) | 3% |
| 3-BB(2F,5F)B-4 | (3-1-3) | 9% |
| 3-BB(2F,5F)B-5 | (3-1-3) | 10% |
| 3-HBB(F)B-2 | (3-2-2) | 3% |
| 4-HBB(F)B-3 | (3-2-2) | 3% |
| 3-Np(F)B(F,F)-F | (—) | 10% |

NI = 98.9° C.; $T_C \leqq -20°$ C.; $\Delta n = 0.179$; $\Delta \epsilon = 8.3$; $\gamma 1 = 246.3$ mPa · s; Vth = 1.37 V; VHR-1 = 99.0%; VHR-2 = 94.7%; NI(UV) = 98.7° C.

Example 25

| | | |
|---|---|---|
| 3-BB(F,F)B-F | (1-1) | 10% |
| 5-BB(F,F)B-F | (1-1) | 10% |
| 2-HBB(F,F)-F | (2-1-1) | 9% |
| 3-HBB(F,F)-F | (2-1-1) | 18% |
| 4-HBB(F,F)-F | (2-1-1) | 5% |
| 5-HBB(F,F)-F | (2-1-1) | 5% |
| 2-HHBB(F,F)-F | (2-2-1) | 4% |
| 3-HHBB(F,F)-F | (2-2-1) | 4% |
| 2-BB(F)B-3 | (3-1-1) | 5% |
| 2-BB(F)B-5 | (3-1-1) | 5% |
| 3-BB(2F,5F)B-3 | (3-1-3) | 5% |
| 5-HBB(F)B-2 | (3-2-2) | 4% |
| 5-HBB(F)B-3 | (3-2-2) | 4% |
| 3-BB(F,F)XB(F,F)-F | (4-1) | 6% |
| 5-BB(F,F)XB(F,F)-F | (4-1) | 6% |

NI = 98.5° C.; $T_C \leqq -20°$ C.; $\Delta n = 0.178$; $\Delta \epsilon = 10.4$; $\gamma 1 = 8.4$ mPa · s; Vth = 1.23 V; VHR-1 = 98.6%; VHR-2 = 72.1%; NI(UV) = 97.8° C.

Example 26

| | | |
|---|---|---|
| 3-BB(F,F)B-F | (1-1) | 6% |
| 4-BB(F,F)B-F | (1-1) | 5% |
| 5-BB(F,F)B-F | (1-1) | 5% |
| 2-HBB(F,F)-F | (2-1-1) | 9% |
| 3-HBB(F,F)-F | (2-1-1) | 22% |
| 4-HBB(F,F)-F | (2-1-1) | 5% |
| 5-HBB(F,F)-F | (2-1-1) | 5% |
| 2-HHBB(F,F)-F | (2-2-1) | 4% |
| 3-HH2BB(F,F)-F | (2-2-2) | 4% |
| 2-BB(F)B-5 | (3-1-1) | 5% |
| 2-BB(2F,5F)B-2 | (3-1-3) | 5% |
| 3-BB(2F,5F)B-3 | (3-1-3) | 5% |
| 5-HBB(F)B-2 | (3-2-2) | 4% |
| 5-HBB(F)B-3 | (3-2-2) | 4% |
| 2-BB(F,F)XB(F,F)-OCF3 | (4-3) | 3% |
| 3-BB(F,F)XB(F,F)-OCF3 | (4-3) | 3% |
| 2-BB(F,F)XB(F)-OCF3 | (4-4) | 3% |
| 3-BB(F,F)XB(F)-OCF3 | (4-4) | 3% |

NI = 97.9° C.; $T_C \leqq -20°$ C.; $\Delta n = 0.175$; $\Delta \epsilon = 10.0$; $\gamma 1 = 238.4$ mPa · s; Vth = 1.25 V; VHR-1 = 98.4%; VHR-2 = 72.9%; NI(UV) = 97.2° C.

Example 27

| | | |
|---|---|---|
| 3-BB(F,F)B-F | (1-1) | 9% |
| 5-BB(F,F)B-F | (1-1) | 9% |
| 1V2-BB(F,F)B-F | (1-1) | 4% |
| 3-BB(F,F)B-CL | (1-2) | 4% |
| 2-HBB(F,F)-F | (2-1-1) | 9% |
| 3-HBB(F,F)-F | (2-1-1) | 9% |
| 4-HBB(F,F)-F | (2-1-1) | 5% |
| 5-HBB(F,F)-F | (2-1-1) | 5% |
| 2-HHBB(F,F)-F | (2-2-1) | 4% |
| 3-HHBB(F,F)-F | (2-2-1) | 4% |
| 2-BB(F)B-5 | (3-1-1) | 5% |
| 2-BB(2F,5F)B-3 | (3-1-3) | 5% |
| 3-BB(2F,5F)B-5 | (3-1-3) | 6% |
| 5-HBB(F)B-2 | (3-2-2) | 4% |
| 5-HBB(F)B-3 | (3-2-2) | 4% |
| 3-BB(F,F)XB(F,F)-F | (4-1) | 5% |
| 3-BB(F,F)XB(F)-F | (4-2) | 5% |
| 3-BB(F,F)XB(F,F)-OCF3 | (4-3) | 4% |

NI = 99.2° C.; $T_c \leqq -10°$ C.; $\Delta n = 0.187$; $\Delta \epsilon = 10.7$; $\gamma 1 = 248.7$ mPa · s; Vth = 1.25 V; VHR-1 = 98.3%; VHR-2 = 66.0%; NI(UV) = 98.4° C.

Example 28

| | | |
|---|---|---|
| 2-BB(F,F)B-F | (1-1) | 5% |
| 3-BB(F,F)B-F | (1-1) | 5% |
| 4-BB(F,F)B-F | (1-1) | 5% |
| 5-BB(F,F)B-F | (1-1) | 5% |
| 2-HBB(F,F)-F | (2-1-1) | 9% |
| 3-HBB(F,F)-F | (2-1-1) | 10% |
| 4-HBB(F,F)-F | (2-1-1) | 5% |

Example 29

| | | |
|---|---|---|
| 2-BB(F, F)B-F | (1-1) | 6% |
| 3-BB(F,F)B-F | (1-1) | 6% |
| 4-BB(F,F)B-F | (1-1) | 6% |
| 5-BB(F,F)B-F | (1-1) | 6% |
| 3-HBB(F,F)-F | (2-1-1) | 23% |
| 3-HB(F)B(F,F)-F | (2-1-3) | 5% |
| 5-HB(F)B(F,F)-F | (2-1-3) | 5% |
| 2-BB(2F,5F)B-2 | (3-1-3) | 5% |
| 5-HBB(F)B-2 | (3-2-2) | 6% |
| 5-HBB(F)B-3 | (3-2-2) | 6% |
| 3-BB(F,F)XB(F,F)-F | (4-1) | 6% |
| 3-BB(F,F)XB(F,F)-OCF3 | (4-3) | 6% |
| 3-BB(F,F)XB(F)-OCF3 | (4-4) | 3% |
| 5-BB(F,F)XB(F)-OCF3 | (4-4) | 3% |

NI = 86.1° C.; $T_C \leq$ -10° C.; $\Delta n$ = 0.177; $\Delta\epsilon$ = 12.6; $\gamma 1$ = 247.3 mPa · s; Vth = 1.08V; VHR-1 = 98.9%; VHR-2 = 61.8%; NI(UV) = 85.9° C.

Although the invention has been described and illustrated with a certain degree of particularity, it is understood that the present disclosure has been made only by way of example, and that numerous changes in the conditions and order of steps can be resorted to by those skilled in the art without departing from the spirit and scope of the invention.

What is claimed is:

1. A liquid crystal composition having a nematic phase comprising at least one compound selected from a group of compounds represented by formula (1) as a first component and at least one compound selected from a group of compounds represented by formula (2-1) or (2-2) as a second component:

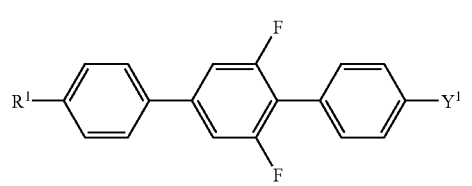
(1)

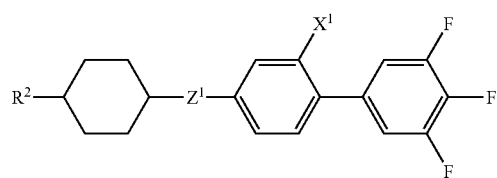
(2-1)

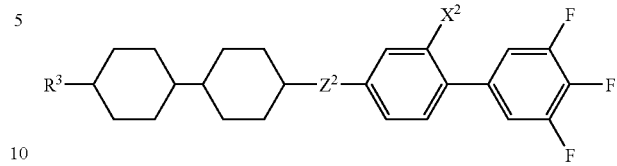
(2-2)

wherein $R^1$ is alkyl having 1 to 12 carbons or alkenyl having 2 to 12 carbons; $R^2$ and $R^3$ are independently alkyl having 1 to 12 carbons; $Z^1$ and $Z^2$ are independently a single bond or ethylene; $Y^1$ is fluorine or chlorine; and $X^1$ and $X^2$ are independently hydrogen or fluorine.

2. The liquid crystal composition according to claim 1, wherein the second component is at least one compound selected from a group of compounds represented by formula (2-1).

3. The liquid crystal composition according to claim 1, wherein the second component is at least one compound selected from a group of compounds represented by formula (2-2).

4. The liquid crystal composition according to claim 1, wherein the second component is at least one compound selected from a group of compounds represented by formula (2-1) and at least one compound selected from a group of compounds represented by formula (2-2).

5. The liquid crystal composition according to claim 1, wherein the ratio of the first component is in a range of from approximately 5% to approximately 30% by weight and the ratio of the second component is in a range of from approximately 30% to approximately 85% by weight, based on the total weight of the liquid crystal compounds.

6. The liquid crystal composition according to claim 1, wherein the composition further comprises at least one compound selected from a group of compounds represented by formula (2-1) as a second component and at least one compound selected from a group of compounds represented by formula (3-1) as a third component:

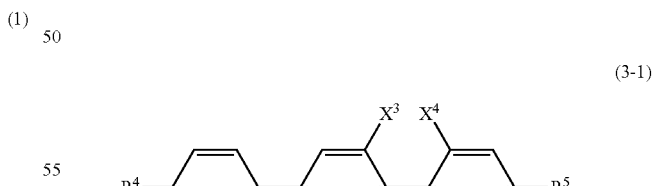
(3-1)

wherein $R^4$ and $R^5$ are independently alkyl having 1 to 12 carbons; and $X^3$, $X^4$ and $X^5$ are independently hydrogen or fluorine.

7. The liquid crystal composition according to claim 1, wherein the composition further comprises at least one compound selected from a group of compounds represented by formula (2-1) as a second component and at least one compound selected from a group of compounds represented by formula (3-2) as a third component:

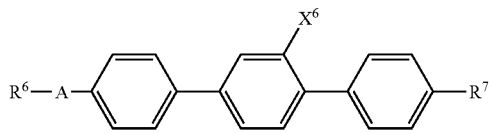
(3-2)

wherein $R^6$ and $R^7$ are independently alkyl having 1 to 12 carbons; A represents 1,4-cyclohexylene or 1,4-phenylene; and $X^6$ is hydrogen or fluorine.

8. The liquid crystal composition according to claim 1, wherein the composition further comprises at least one compound selected from a group of compounds represented by formula (2-1) as a second component and at least one compound selected from a group of compounds represented by formula (3-1) and at least one compound selected from a group of compounds represented by formula (3-2) as a third component:

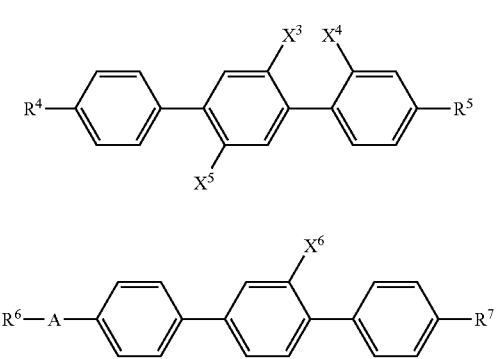
(3-1)

(3-2)

wherein $R^4$, $R^5$, $R^6$ and $R^7$ are independently alkyl having 1 to 12 carbons; A represents 1,4-cyclohexylene or 1,4-phenylene; and $X^3$, $X^4$, $X^5$ and $X^6$ are independently hydrogen or fluorine.

9. The liquid crystal composition according to claim 1, wherein the composition further comprises at least one compound selected from a group of compounds represented by formula (2-2) as a second component, and at least one compound selected from a group of compounds represented by formula (3-1) as a third component:

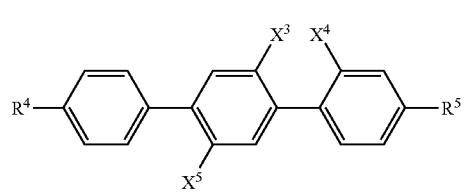
(3-1)

wherein $R^4$ and $R^5$ are independently alkyl having 1 to 12 carbons; and $X^3$, $X^4$ and $X^5$ are independently hydrogen or fluorine.

10. The liquid crystal composition according to claim 1, wherein the composition further comprises at least one compound selected from a group of compounds represented by formula (2-2) as a second component and at least one compound selected from a group of compounds represented by formula (3-2) as a third component:

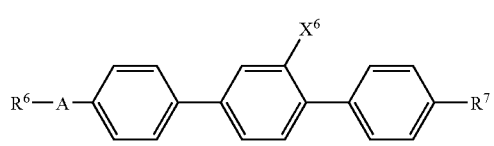
(3-2)

wherein $R^6$ and $R^7$ are independently alkyl having 1 to 12 carbons; A represents 1,4-cyclohexylene or 1,4-phenylene; and $X^6$ is hydrogen or fluorine.

11. The liquid crystal composition according to claim 1, wherein the composition further comprises at least one compound selected from a group of compounds represented by formula (2-2) as a second component and at least one compound selected from a group of compounds represented by formula (3-1) and at least one compound selected from a group of compounds represented by formula (3-2) as a third component:

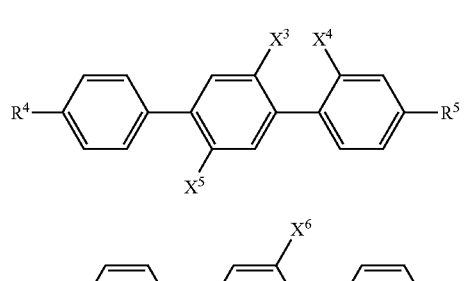
(3-1)

(3-2)

wherein $R^4$, $R^5$, $R^6$ and $R^7$ are independently alkyl having 1 to 12 carbons; A is 1,4-cyclohexylene or 1,4-phenylene; and $X^3$, $X^4$, $X^5$ and $X^6$ are independently hydrogen or fluorine.

12. The liquid crystal composition having a nematic phase according to claim 1, wherein the composition comprises at least one compound selected from a group of compounds represented by formula (1), at least one compound selected from a group of compounds represented by formula (2-1) or formula (2-2) as a second component and at least one compound selected from a group of compounds represented by formula (3-1) and at least one compound selected from a group of compounds represented by formula (3-2) as a third component:

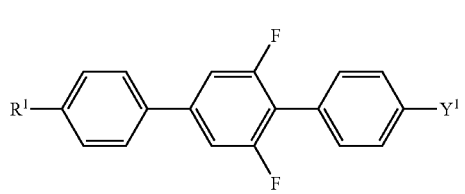
(1)

-continued

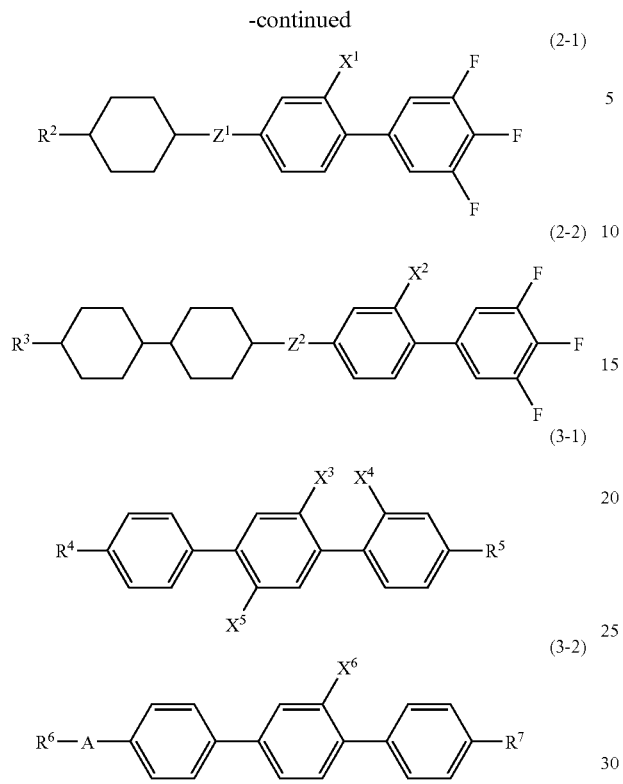

(2-1)
(2-2)
(3-1)
(3-2)

wherein $R^1, R^2, R^3, R^4, R^5, R^6$ and $R^7$ are independently alkyl having 1 to 12 carbons; $Z^1$ and $Z^2$ are independently a single bond or ethylene; $Y^1$ and $X^6$ are fluorine; $X^1, X^2$ and $X^4$ are hydrogen; $X^3$ and $X^5$ are independently hydrogen or fluorine but at least one of $X^3$ and $X^5$ is fluorine; and A is 1,4-cyclohexylene.

13. The liquid crystal composition according to claim 12, wherein the ratio of the first component is in a range of from approximately 5% to approximately 30% by weight, the ratio of the second component is in a range of from approximately 30% to approximately 85% by weight and the ratio of the third component is in a range of from approximately 5% to approximately 40% by weight, based on the total weight of the liquid crystal compounds.

14. A liquid crystal composition having a nematic phase consisting essentially of at least one compound selected from a group of compounds represented by formula (1) as a first component, at least one compound selected from a group of compounds represented by formula (2-1) and at least one compound selected from a group of compounds represented by formula (2-2) as a second component, and at least one compound selected from a group of compounds represented by formula (3-1) or (3-2) as a third component:

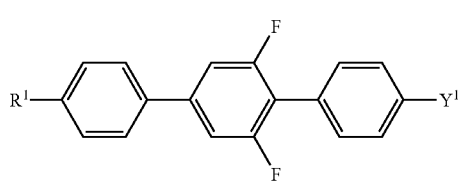

(1)

-continued

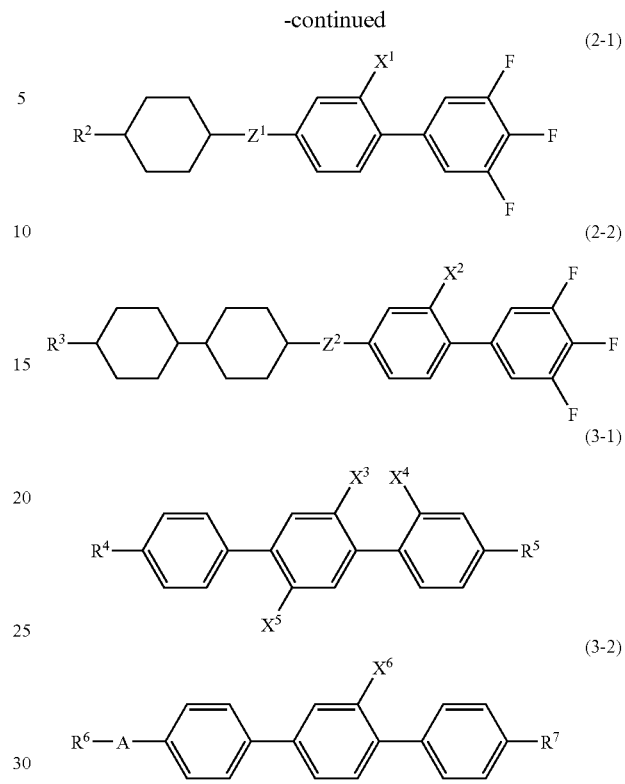

(2-1)
(2-2)
(3-1)
(3-2)

wherein $R^1$ is alkyl having 1 to 12 carbons or alkenyl having 2 to 12 carbons; $R^2, R^3, R^4, R^5, R^6$ and $R^7$ are independently alkyl having 1 to 12 carbons; A is 1,4-cyclohexylene or 1,4-phenylene; $Z^1$ and $Z^2$ are independently a single bond or ethylene; $Y^1$ is fluorine or chlorine; and $X^1, X^2, X^3, X^4, X^5$ and $X^6$ are independently hydrogen or fluorine.

15. The liquid crystal composition according to claim 14, wherein the third component is at least one compound selected from a group of compounds represented by formula (3-1).

16. The liquid crystal composition according to claim 14, wherein the third component is at least one compound selected from a group of compounds represented by formula (3-2).

17. The liquid crystal composition according to claim 14, wherein the third component is at least one compound selected from a group of compounds represented by formula (3-1) and at least one compound selected from a group of compounds represented by formula (3-2).

18. The liquid crystal composition according to claim 14, wherein in formula (1), $R^1$ is alkyl having 1 to 12 carbons, and $Y^1$ is fluorine; in formula (2-1), $X^1$ is hydrogen; in formula (2-2), $X^2$ is hydrogen; in formula (3-1), at least one of $X^3$ and $X^5$ is fluorine, and $X^4$ is hydrogen; and in formula (3-2), A is 1,4-cyclohexylene, and $X^6$ is fluorine.

19. The liquid crystal composition according to claim 14, wherein the ratio of the first component is in a range of from approximately 5% to approximately 30% by weight, the ratio of the second component is in a range of from approximately 30% to approximately 85% by weight and the ratio of the third component is in a range of from approximately 5% to approximately 40% by weight, based on the total weight of the liquid crystal compounds.

20. A liquid crystal composition having a nematic phase comprising at least one compound selected from a group of compounds represented by formula (1) as a first component, at least one compound selected from a group of compounds represented by formula (2-1) and at least one compound selected from a group of compounds represented by formula (2-2) as a second component, at least one compound selected from a group of compounds represented by formula (3-1) or (3-2) as a third component and at least one compound selected from a group of compounds represented by formula (4) as a fourth component:

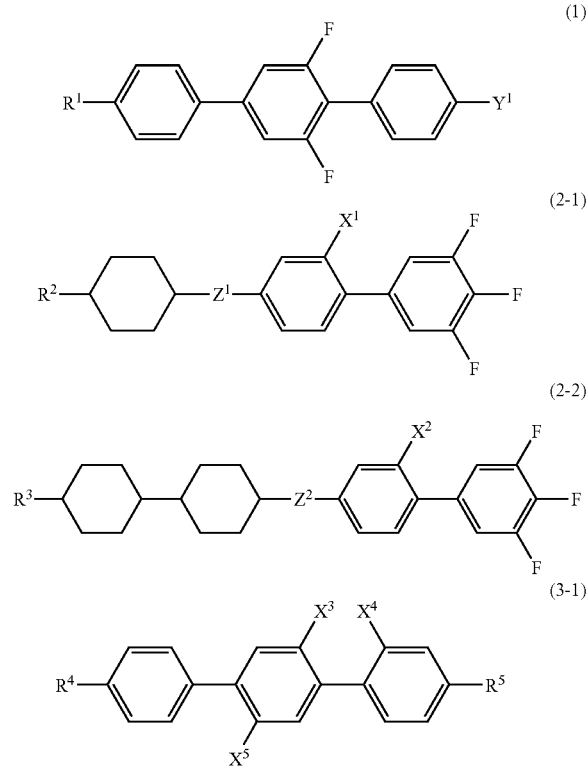

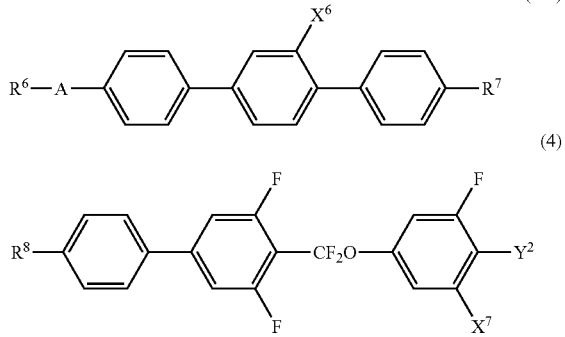

wherein $R^1$ is alkyl having 1 to 12 carbons or alkenyl having 2 to 12 carbons; $R^2$, $R^3$, $R^4$, $R^5$, $R^6$, $R^7$ and $R^8$ are independently alkyl having 1 to 12 carbons; A is 1,4-cyclohexylene or 1,4-phenylene; $Z^1$ and $Z^2$ are independently a single bond or ethylene; $X^1$, $X^2$, $X^3$, $X^4$, $X^5$, $X^6$ and $X^7$ are independently hydrogen or fluorine; $Y^1$ is fluorine or chlorine; and $Y^2$ is fluorine or trifluoromethoxy.

21. The liquid crystal composition according to one of claim 20, wherein the ratio of the fourth component is in a range of from approximately 1% to approximately 10% by weight based on the total weight of the liquid crystal compounds.

22. The liquid crystal composition according to claim 1, wherein the maximum temperature of a nematic phase is approximately 95° C. or more, the optical anisotropy (25° C.) at a wavelength of 589 nm is approximately 0.16 or more and the dielectric anisotropy (25° C.) at a frequency of 1 kHz is approximately 8 or more.

23. The liquid crystal composition according to claim 1, wherein the composition further comprises an ultraviolet ray absorbent.

24. A liquid display device comprising the liquid crystal composition according to claim 1.

* * * * *